(12) United States Patent
Klappert et al.

(10) Patent No.: US 8,387,084 B1
(45) Date of Patent: Feb. 26, 2013

(54) SYSTEMS AND METHODS FOR DETECTING UNAUTHORIZED USE OF A USER EQUIPMENT DEVICE

(75) Inventors: Walter R. Klappert, Los Angeles, CA (US); Daniel Thomas Ward, Los Angeles, CA (US); Greg DeCamp, Simi Valley, CA (US); Haig Krakirian, Burbank, CA (US); Thomas Patrick Antalek, Hermosa Beach, CA (US)

(73) Assignee: United Video Properties, Inc., Santa Clara, CA (US)

( * ) Notice: Subject to any disclaimer, the term of this patent is extended or adjusted under 35 U.S.C. 154(b) by 0 days.

(21) Appl. No.: 13/247,098

(22) Filed: Sep. 28, 2011

(51) Int. Cl.
*H04N 7/16* (2011.01)

(52) U.S. Cl. .................. 725/25; 725/30; 725/31; 725/9; 725/11; 725/19; 380/258

(58) Field of Classification Search .......................... None
See application file for complete search history.

(56) References Cited

U.S. PATENT DOCUMENTS

| | | |
|---|---|---|
| 4,890,321 A | 12/1989 | Seth-Smith et al. |
| 5,231,665 A | 7/1993 | Auld et al. |
| 5,357,276 A | 10/1994 | Banker et al. |
| 5,418,559 A | 5/1995 | Blahut |
| 5,438,355 A | 8/1995 | Palmer |
| 6,973,669 B2 | 12/2005 | Daniels |
| 7,437,751 B2 | 10/2008 | Daniels |
| 7,895,614 B2 | 2/2011 | Tsuria et al. |
| 2002/0032907 A1 | 3/2002 | Daniels |
| 2002/0100044 A1 | 7/2002 | Daniels |
| 2002/0100052 A1 | 7/2002 | Daniels |
| 2005/0028208 A1* | 2/2005 | Ellis et al. ........................ 725/58 |
| 2007/0157281 A1* | 7/2007 | Ellis et al. ...................... 725/134 |
| 2008/0092157 A1* | 4/2008 | Walter et al. .................... 725/25 |
| 2008/0136969 A1* | 6/2008 | Chang et al. .................. 348/557 |
| 2008/0233946 A1* | 9/2008 | Henry ......................... 455/422.1 |
| 2011/0007659 A1* | 1/2011 | Yahagi et al. ................. 370/252 |
| 2011/0247027 A1* | 10/2011 | Davis et al. ........................ 725/5 |

* cited by examiner

*Primary Examiner* — Joshua Taylor
(74) *Attorney, Agent, or Firm* — Ropes & Gray LLP

(57) ABSTRACT

Systems and methods for detecting unauthorized use of a user equipment device are provided. An instruction is transmitted, using communications circuitry of a handheld device, to the user equipment device directing the user equipment device to display a unique identifier associated with the user equipment simultaneously with media content. An image of the media content and unique identifier simultaneously displayed on a display screen coupled to the user equipment device is captured using camera equipment of the handheld device. The image is automatically processed with the handheld device to extract the unique identifier from the image. The extracted unique identifier is cross-referenced, using the handheld device, with user account information associated with the user equipment device to determine whether use of the user equipment device is unauthorized.

16 Claims, 11 Drawing Sheets

SYSTEMS AND METHODS FOR DETECTING UNAUTHORIZED USE OF A USER EQUIPMENT DEVICE

BACKGROUND

Typically, content providers offer consumers that operate a business in a public place (e.g., a tavern) service for use in the public place at a higher cost than consumers that use the service in a private residence. In addition, the level and type of service authorized for a particular consumer is programmed into the consumer's device (e.g., set-top-box). Thus, a consumer that operates a business can pay a lower price for service by deceptively purchasing service offered for private use and using that service publicly at the business location by connecting the device programmed for the private residence to the business location. Such unauthorized use is difficult for the content providers to detect without physically inspecting each suspected consumer device at the suspected location.

SUMMARY OF THE INVENTION

In view of the foregoing, systems and methods for detecting unauthorized use of a user equipment device are provided. In particular, an operator device at a user site receives a fingerprint from a user equipment device and, based on the received fingerprint, the operator device detects misuse of the user equipment device. The fingerprint is a unique identifier of the user equipment device.

In some embodiments, a user equipment device may determine a need to retrieve from memory a fingerprint associated with the user equipment device. The fingerprint may be an object that uniquely identifies the user equipment device to a service provider. For example, the fingerprint or unique identifier may be an object that includes a unique image, text, graphic, audible tone or tones, sound, alphanumerical sequence, value, a sequence of images, a sequence of text, a sequence of graphics, a sequence of tone or tones, a sequence of alphanumerical values, or other unique identifier. In some implementations, the user equipment device determines a need to retrieve the fingerprint in response to the user equipment receiving an instruction from an operator device of the service provider. In some implementations, the user equipment device determines a need to retrieve the fingerprint in response to detecting that a predetermined content is being displayed and/or that a predetermined content source is being accessed. In some embodiments, the user equipment device retrieves the fingerprint from memory by having a media guidance application call a system function that requests access to the fingerprint stored in a dedicated portion of memory of the user equipment device.

In some embodiments, the user equipment device may make the fingerprint available to a service provider operator (operator device) located within the user site. For example, the user equipment device may display the retrieved fingerprint on the display at a predetermined time and/or at a predetermined location on the screen. In some implementations, the user equipment device may scramble the displayed fingerprint using various colors to hide the fingerprint so that the fingerprint only becomes visible when viewed by an operator with an optical device with the corresponding colors. In some embodiments, in addition to or instead of displaying the fingerprint, the user equipment device may make the fingerprint available by transmitting a communication to a nearby operator device that includes the fingerprint. In some embodiments, in addition to or instead of displaying the fingerprint, the user equipment device may make the fingerprint available by playing a tone or audio signal that can only be heard and discerned by an operator device.

In some embodiments, the service provider operator device may determine whether use of the user equipment device is unauthorized based on the fingerprint in response to the fingerprint being made available. In particular, the operator device may determine that the user equipment device is being misused based on the fingerprint. In some implementations, an operator of the operator device may manually input the fingerprint displayed on a screen associated with the user equipment device into the operator device. The operator device may cross-reference the received fingerprint with user account information associated with fingerprints. In particular, the operator device may query or search a locally stored or remotely stored database for user account information that matches a fingerprint that has been made available.

In some embodiments, the operator device may detect misuse of the user equipment device based on the user account information retrieved from the database. In particular, the operator device may display the user account information to an operator. For example, the user account information may include a list of authorized services (e.g., content that may be displayed or content source that may be accessed) for a given user equipment device and/or a list of authorized locations (e.g., addresses, residential or commercial authorization, GPS coordinates, etc.) for the user equipment device. In some implementations, an operator may compare the displayed user account information with the location and/or content being consumed on the user equipment device. When a mismatch is determined, the operator may determine that the user equipment device is being misused.

Alternatively, the operator may input criteria of the user equipment device use (e.g., a location or content that is being consumed) and the operator device may automatically compare the received criteria with the user account information to detect misuse. In particular, when the criterion (e.g., a content source) is determined not to be included in the list of authorized services of the user account information (e.g., content sources listed), the operator device may determine that the user equipment device is being misused. When the operator device detects that the user equipment device is being misused, the operator device may display or provide an alert to the operator indicating that misuse has been detected. In some implementations, when the criterion (e.g., a content source) is determined to be included in the list of authorized services of the user account information (e.g., content sources listed), the operator device may determine that the user equipment device is not being misused. When the operator device detects that the user equipment device is not being misused, the operator device may display or provide an alert to the operator indicating that use of the user equipment device is authorized.

In some embodiments, the operator device may be a handheld device that includes camera equipment. The handheld device may transmit, using communications circuitry (e.g., radio frequency communication, Bluetooth and/or WiFi), an instruction to the user equipment device to cause the user equipment device to display the unique identifier associated with the user equipment device. In response to receiving the instruction from the handheld device, the user equipment device may retrieve the unique identifier from a memory of the user equipment device and display on a display screen coupled to the user equipment device the retrieved unique identifier simultaneously (e.g., as an overlay) with media content being displayed on the display device. The handheld device may automatically synchronize the transmission of the instruction to the user equipment device requesting the display of the unique identifier with activation of the camera equipment of the handheld device. In particular, once the user equipment device displays the unique identifier on the display screen simultaneously with the media content, the handheld device may capture an image of the display screen.

The handheld device may automatically process the captured image to separate the media content from the unique identifier and extract the unique identifier from the captured image. The handheld device may automatically access a database which includes a mapping between unique identifiers and user account information. The database may be locally stored on the handheld device or stored in a remote database. In the case where the database is locally stored, the handheld device may retrieve from the database the user account information associated with the extracted unique identifier. In the case where the database is stored in a remote location (e.g., a remote server), the handheld device may transmit the extracted unique identifier to the remote location and may subsequently receive back from the remote location the corresponding user account information.

In some implementations, the handheld device may determine the location of the user equipment device by retrieving Global Positioning System (GPS) coordinates from GPS circuitry included in the handheld device and automatically compare the determined location with a location specified in the user account information. The handheld device may display on a display screen coupled to the handheld device an indication of whether use of the user equipment device is authorized. In particular, when the location specified in the user account information matches the determined location, the handheld device may display an indication that use is authorized; otherwise the handheld device may display an indication that use is unauthorized. In some implementations, the handheld device may determine what content is being displayed or what content source is being accessed by processing the captured image to extract the media content in the image and receiving user input identifying the media content or media content source. When the media content or the content source specified in the user account information matches the determined media content being displayed or content source being accessed, the handheld device may display an indication that use is authorized; otherwise the handheld device may display an indication that use is unauthorized.

In some implementations, the unique identifier may be displayed for less than a few seconds requiring the handheld device to automatically ensure the timing between the transmission of the request and the image capture of the content being displayed is accurate so that the image that is captured includes the displayed fingerprint. In particular, if the handheld device is late or early in capturing the image, the captured image may not include the displayed unique identifier. In some implementations, the handheld device may activate the camera equipment to capture an image displayed on the display device accounting for delay incurred in transmitting the instruction requesting the display of the unique identifier, the user equipment retrieving the unique identifier from memory, and displaying the unique identifier.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
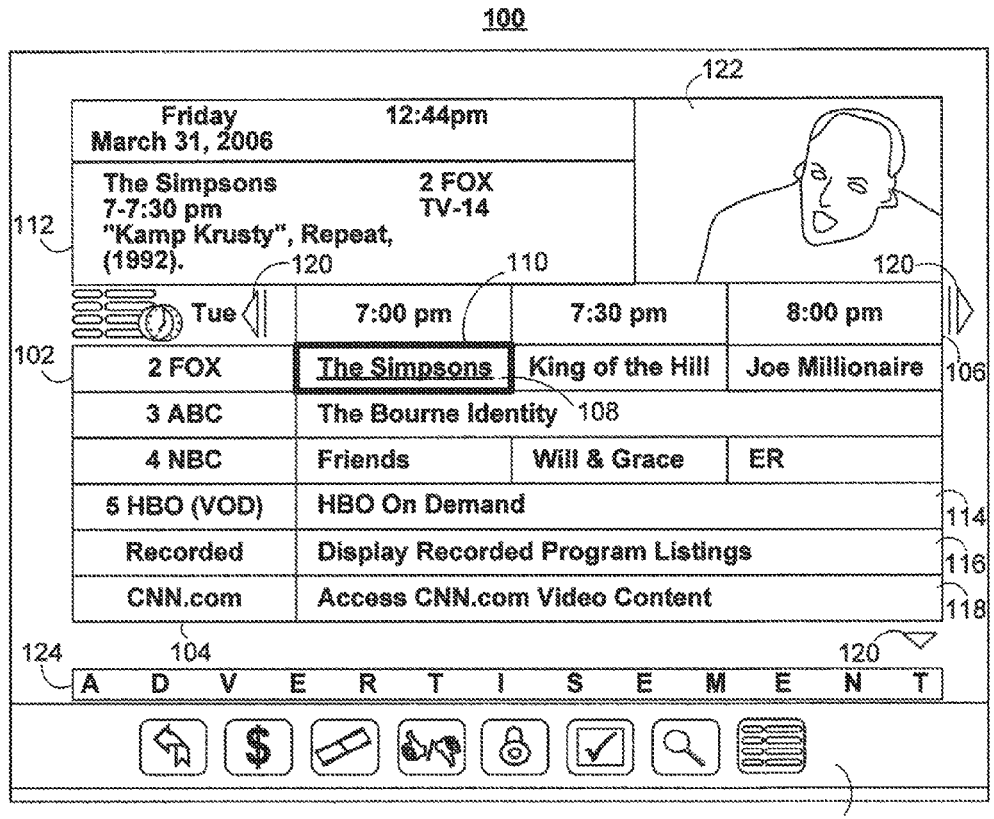
FIGS. 1 and 2 show illustrative display screens that may be used to provide media guidance application listings in accordance with an embodiment of the invention.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application, a video guidance application, or a guidance application.

Interactive media guidance applications may take various forms depending on the media for which they provide guidance. One typical type of media guidance application is an interactive television program guide. Interactive television program guides (sometimes referred to as electronic program guides or video guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc. Guidance applications also allow users to navigate among and locate multimedia content. The term multimedia is defined herein as media and content that utilizes at least two different content forms, such as text, audio, still images, animation, video, and interactivity content forms. Multimedia content may be recorded and played, displayed or accessed by information content processing devices, such as computerized and electronic devices, but can also be part of a live performance. It should be understood that the embodiments that are discussed in relation to media content are also applicable to other types of content, such as video, audio and/or multimedia.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile or remote devices. On these devices users are able to navigate among and locate the same media available through a television. Consequently, media guidance is necessary on these devices as well. The guidance provided may be for media content available only through a television, for media content available only through one or more of these devices, or for media content available both through a television and one or more of these devices. The media guidance applications may be provided as on-line applications (i.e., provided on a website), or as stand-alone applications or clients on hand-held computers, PDAs, mobile telephones, or other mobile devices. The various devices and platforms that may implement media guidance applications are described in more detail below.

Figure 2:
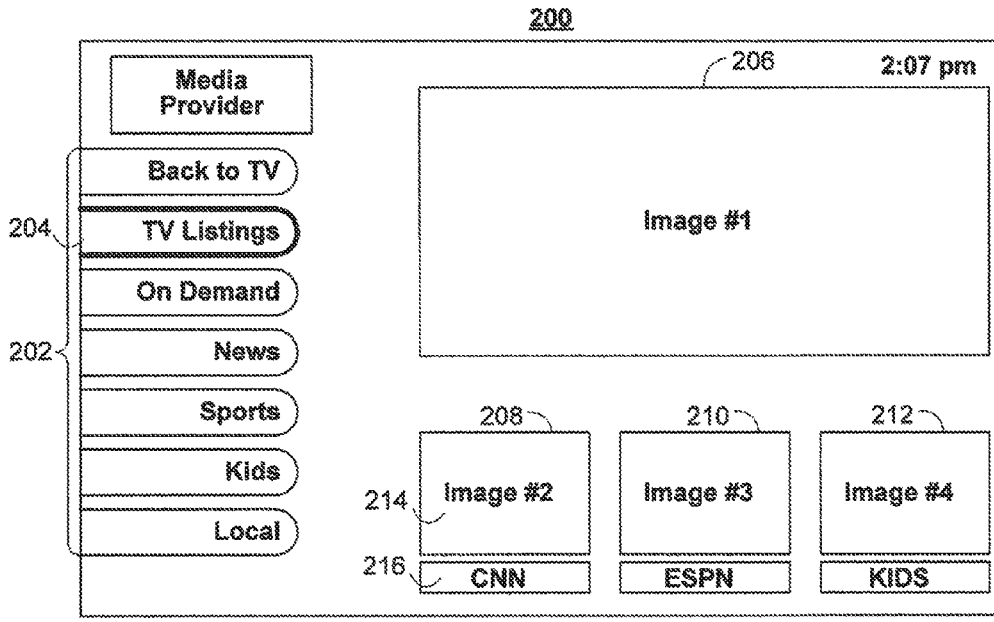

One of the functions of the media guidance application is to provide media listings and media information to users. FIGS. 1-2 show illustrative display screens that may be used to provide media guidance, and in particular media listings. The display screens shown in FIGS. 1-2 and 5-8 may be implemented on any suitable device or platform. While the displays of FIGS. 1-2 and 5-8 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device (e.g., a touch screen which allows the user to press the button by touching the location of the button on the screen). In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content; provide information about a product or a service; enable purchasing of media content, a product, or a service; provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005; Boyer et al., U.S. patent application Ser. No. 09/437,304, filed Nov. 9, 1999; and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
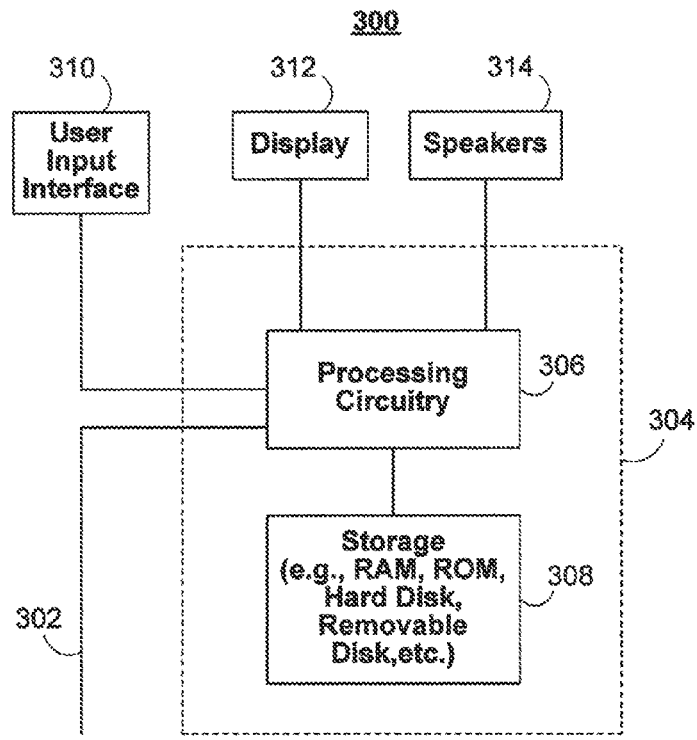
FIG. 3 shows an illustrative user equipment device in accordance with another embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Nonvolatile memory may also be used (e.g., to launch a boot-up routine and other instructions).

In some embodiments, storage 308 may include a dedicated nonvolatile memory or electronic storage that stores a fingerprint that is associated with the device in which storage 308 is located. For example, storage 308 may be part of a user equipment device (such as a set-top-box or mobile device) and may store a fingerprint (or unique identifier) unique to that device. The fingerprint or unique identifier may be an object that uniquely identifies the user equipment device (or the device in which the fingerprint is stored) to a service provider. The object may be a unique image, text, graphic, audible tone or tones, alphanumerical sequence, value, a sequence of images, a sequence of text, a sequence of graphics, a sequence of tone or tones, a sequence of alphanumerical values, or other unique identifier. The service provider may be any media content source and/or data source that provides a user with authorization and access to media content (e.g., media content source 416 or media guidance data source 418 of FIG. 4). In some implementations, the fingerprint may enable the service provider or an operator of the service provider to retrieve user account information associated with the device in which the fingerprint is stored.

The user account information may indicate the level of authorization provided by the service provider to the device on which the fingerprint is stored. For example, the level of authorization may indicate what video or programming packages the device is authorized to access and/or view. For example, the level of authorization may indicate what sporting events (such as soccer games) the device is authorized to access and/or view. The level of authorization may indicate whether the device is authorized for placement in a public place (e.g., a tavern) and/or whether the device is only authorized for placement in a private residence. This allows an operator of the service provider or the service provider itself to determine or detect misuse of the device on which the fingerprint is stored. It should be understood that the term "misuse" is synonymous with the phrase "unauthorized use." Namely, a user equipment device that is being misused is being used in an unauthorized manner or manner that is unauthorized by a service provider.

In some embodiments, storage 308 may include a programmable memory or programmable logic array that stores the fingerprint. For example, storage 308 may include a programmable logic device, field programmable gate array or any other type of programmable device that can be used to store the fingerprint. In such circumstances, the fingerprint stored in storage 308 may be updated locally or remotely by the service provider or operator of the service provider. For example, the service provider may transmit instructions to the device in which the fingerprint is stored to cause the device to modify the stored fingerprint. In some implementations, the instructions received by the device from the service provider may include a new fingerprint which may be used to replace the fingerprint stored in storage device 308 and the device receiving the instructions may reprogram storage 308 to replace the fingerprint with the newly received fingerprint. In some implementations, the instructions received by the device from the service provider may include a formula or algorithm that the device can use to generate a new fingerprint based on the previously stored fingerprint and replace the previously stored fingerprint with the newly generated fingerprint. In some implementations, an operator of the service provider may update or reprogram storage 308 with a different fingerprint locally at the location of the device.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, camera equipment (still or video camera) or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

In some embodiments, control circuitry 304 may retrieve from storage 308 a fingerprint and make the fingerprint available to a device of an operator of the service provider. It should be understood that as referred to herein, the phrase "make available" should be understood to mean providing the object (e.g., the fingerprint) to a recipient by any means including by electronically communicating over a link the object to another device, displaying the object for a predetermined time and at a predetermined location, audibly communicating the object (e.g., by playing back a sound only recognizable by an operator device and inaudible to a human), and/or any combination of the same. For example, control circuitry 304 may make the fingerprint available by displaying the fingerprint on display 312. Control circuitry 304 may be programmed to make available or display the fingerprint at a predetermined time and/or at a predetermined location on display 312. For example, control circuitry 304 may display the fingerprint every fifteen minutes in an upper-right corner of display 312. In some implementations, the location on display 312 in which the fingerprint is displayed is inconspicuous to the user. In particular, the display of the fingerprint on display 312 may be designed to not interfere with other content being displayed (e.g., a soccer game) and at a time and position on the screen that is only known and expected by an operator of the service provider. In some embodiments, the fingerprint may be displayed on display 312 in response to control circuitry 304 receiving an instruction or command from a device of an operator of the service provider.

As referred to herein, the phrase "operator device," "service provider device" or "device of an operator," or any variation thereof should be understood to mean a device that an operator of the service provider can use to detect misuse of a user equipment device. The operator device may include all or some of the same circuitry and components as depicted and described in connection with FIG. 3. An operator should be understood to mean a person or machine that represents the service provider and who detects fraud or misuse of user equipment devices on site or location of the user. The user equipment devices are devices users operate to access services (e.g., television channels, entertainment packages, videos, audios, programming, media, websites, etc.) provided by the service provider.

In some implementations, the device of the operator may be within a same location (e.g., inside or within a short distance of a tavern) in which the user equipment in which the fingerprint is stored is located. The operator device may instruct the user equipment to make the fingerprint available and in response control circuitry 304 of the user equipment may retrieve and display the fingerprint. The fingerprint may be displayed for a predetermined time period (e.g., 30 seconds) and may then be removed from the display by control circuitry 304.

In some embodiments, the operator device may receive the fingerprint from the user equipment over a short-range communications path (e.g., WiFi, radio-frequency (RF) or BlueTooth). In particular, control circuitry 304 may make the fingerprint available to the operator device by transmitting the fingerprint over the short-range communications path. In such circumstances, control circuitry 304 may not display the fingerprint on the display of the user equipment. The operator device may retrieve user account information associated with the user equipment from which the fingerprint is made available using the fingerprint received through the display and/or the short-range communications path. The operator device may determine or detect misuse of the user equipment by comparing the authorization level indicated by the user account information with the actual use of the user equipment device associated with the fingerprint. For example, the operator device may determine that the user account information authorizes the user equipment for use in a private residence while the user equipment is located in a public place (such as a tavern). In this case, the misuse or fraudulent use is detected and the operator is alerted of the misuse. The operator device may be used to transmit a signal or instruction to the user equipment to disable or turn off the user equipment when misuse or fraud is detected.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from the VBI of a television channel, from an out-of-band feed, or using another suitable approach). In another embodiment, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the guidance application may retrieve the fingerprint to make the fingerprint available to the operator by making a function call to the system resources. In particular, control circuitry 304 may be instructed by the guidance application to retrieve the fingerprint by receiving a function call from the guidance application. The function call may be part of the application programming interface of the user equipment device. The application programming interface of the user equipment device may provide various functions to control the display and operation of the user equipment and which the media application uses to launch various resources (e.g., display elements or control various software/hardware components). Among those functions, a fingerprint function may be provided which the media application may call to cause the fingerprint to be made available (by display or transmission to the operator device). In some implementations, the fingerprint may be displayed independent of the media application so that after the media application makes the call to the function, the media application does not have control over when, where or how the fingerprint is made available. Such functionality avoids the media application and fingerprint function from being hijacked and modified to prevent display of the fingerprint.

In yet other embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be a EBIF widget. In other embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
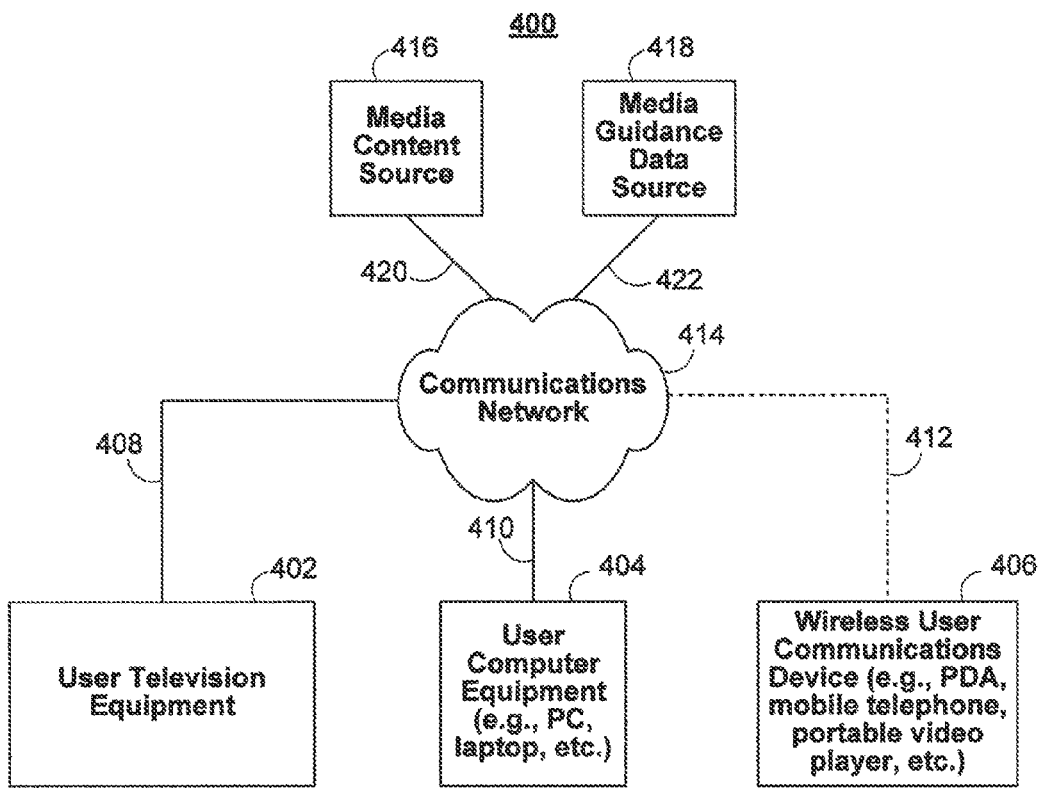
FIG. 4 is a diagram of an illustrative cross-platform interactive media system in accordance with another embodiment of the invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, RF, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 (or service provider) may include one or more types of media distribution equipment including a television distribution facility, cable system headed, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 (or service provider) may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network (e.g., a network in a private residence or a public place such as a tavern). User equipment devices can communicate with each other and with an operator device directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

Figure 5:
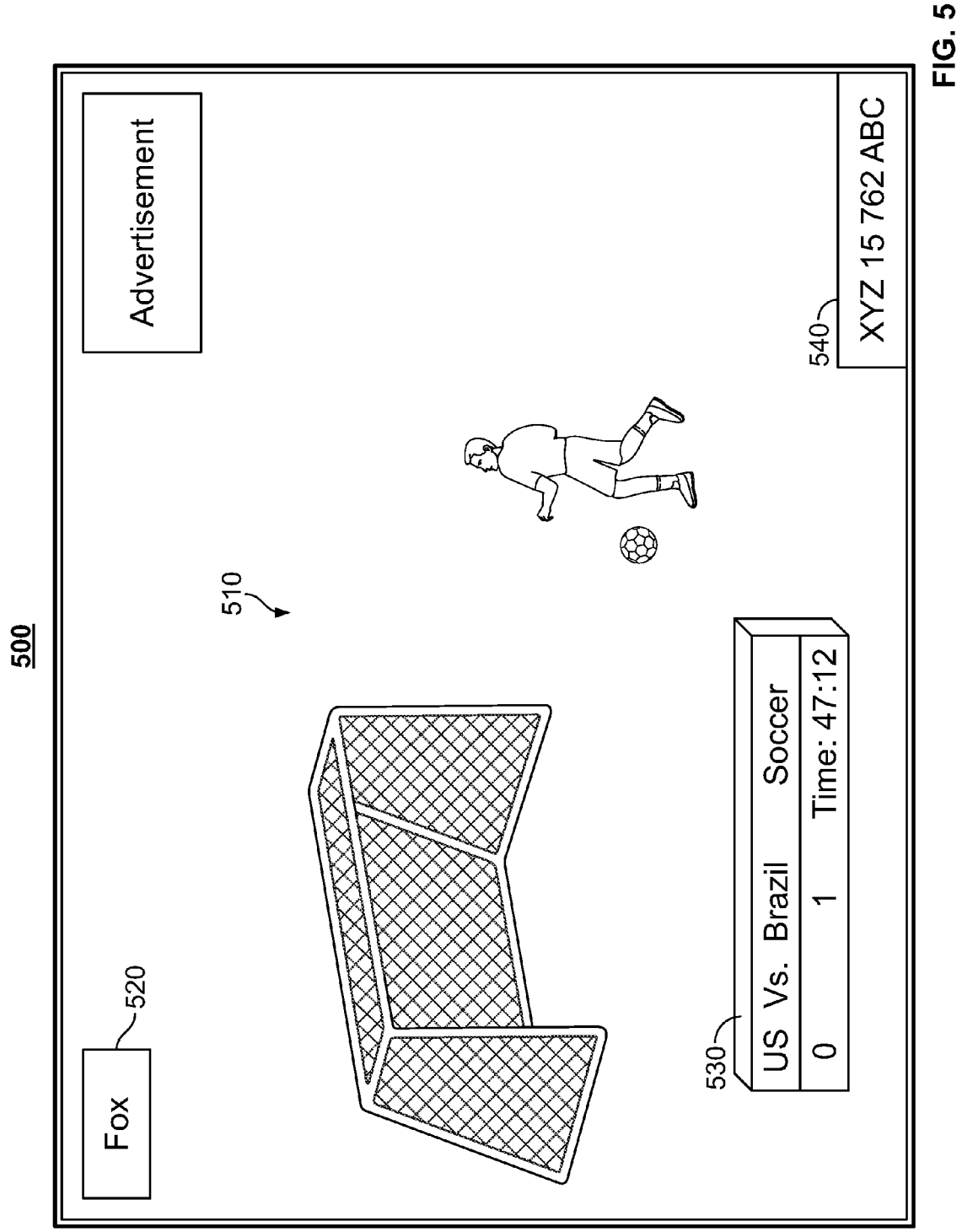
FIG. 5 shows an illustrative display screen that may be used to provide a fingerprint object in accordance with another embodiment of the invention.

FIG. 5 shows an illustrative display screen 500 that may be used to provide a fingerprint object in accordance with an embodiment of the invention. Screen 500 may include a logo 520, an advertisement, a media asset 510, an overlay 530 and a fingerprint 540. The displayed advertisement in screen 500 may be the same or similar as advertisement 124 (FIG. 1) and may have similar functionality as advertisement 124.

In some embodiments, screen 500 may be a display generated by control circuitry 304 of a user equipment device. In particular, control circuitry 304 may receive a user selection of a media asset from grid 102 (FIG. 1) and in response may access a source of the media asset. The media asset may be displayed as media asset 510 on screen 500. For example, control circuitry 304 may receive a user selection of a sporting event (e.g., a soccer game) and may tune to a channel that is broadcasting the selected sporting event.

In some implementations, overlay 530 may be displayed and may include information description media asset 510. For example, overlay 530 may include a detailed description, a video clip or current status of media asset 510. In particular, overlay 530 may include information as to the current score of a game and time left (or time elapsed) when media asset 510 corresponds to a sporting event. In some implementations, overlay 530 may display information about other related or unrelated content as media content 510. For example, when media content 510 is a sporting event, overlay 530 may display information about other sporting events that are related (e.g., the same sport) or unrelated to the sporting event shown as media content 510. In some implementations, overlay 530 may be interactive to allow the user to navigate to view other information (e.g., what is going on in other sources of media or other sporting events) while viewing media content 510.

In some embodiments, control circuitry 304 may retrieve and display fingerprint 540. In particular, control circuitry 304 may monitor the source of media content 510 being displayed and determine whether a fingerprint is associated with the source of media content 510. For example, control circuitry 304 may monitor whether the source of media content 510 is a source of sporting event content and in response may determine that a fingerprint is associated with the source. In some implementations, control circuitry 304 may monitor whether the source of media content 510 corresponds to a source listed or included in a database stored in storage 308. When the source is listed or included in the database, control circuitry 304 may determine that a fingerprint is associated with the source. For example, the database may include a list of media content sources that are associated with a certain level of authorization (e.g., a particular service subscription package) offered by a service provider. In such circumstances, control circuitry 304 may determine that a source of media content 510 is associated with a fingerprint when the source corresponds with a particular level of authorization (e.g., is a source that requires a subscription).

In some embodiments, the database stored in storage 308 that lists sources that are associated with a fingerprint may be preconfigured into storage 308. For example, the database may be included in the manufacturing of the user equipment device with which the fingerprint is associated. In some implementations, the database may be downloaded or installed when the user subscribes to a service provider. For example, the service provider may program or configure the database to list the channels or sources of content that are associated with a fingerprint. The sources included in the database may include Internet sources (e.g., websites), television channels, broadcast channels, terrestrial channels, satellite channels, video-on-demand sources, any source that delivers content to the user equipment or any combination of the same.

In some embodiments, control circuitry 304 may monitor media content 510 being displayed to determine whether a fingerprint is associated with media content 510. For example, control circuitry 304 may monitor whether media content 510 is a sporting event (e.g., is a pay-per-view event) and in response may determine that a fingerprint is associated with media content 510. In some implementations, control circuitry 304 may monitor whether media content 510 corresponds to one of a plurality of media content listed or included in a database stored in storage 308. When media content 510 is listed or included in the database, control circuitry 304 may determine that a fingerprint is associated with media content 510. For example, the database may include a list of media content that are associated with a certain level of authorization (e.g., a particular service subscription package) offered by a service provider. In such circumstances, control circuitry 304 may determine that media content 510 is associated with a fingerprint when media content 510 corresponds with a particular level of authorization (e.g., is a media content that requires a subscription, order or purchase).

In some embodiments, the database stored in storage 308 that lists media content that are associated with a fingerprint may be preconfigured into storage 308. For example, the database may be included in the manufacturing of the user equipment device with which the fingerprint is associated. In some implementations, the database may be downloaded or installed when the user subscribes to a service provider. For example, the service provider may program or configure the database to list the media content that is associated with a fingerprint. The media content included in the database may include Internet media (e.g., websites or media provided by a website), television media, broadcast media, terrestrial media, satellite media, video-on-demand media, or any combination of the same.

In some embodiments, in response to determining that a source or media content is associated with a fingerprint, control circuitry 304 may retrieve and display fingerprint 540. Control circuitry 304 may be instructed to determine whether a source or media content is associated with a fingerprint by the media guidance application running on the user equipment device. For example, in response to receiving a request to access a content source or a given media content, the media guidance application may call a system function (e.g., using an API) and cause control circuitry 304 to determine whether a fingerprint is associated with the source and retrieve the fingerprint if so. Control circuitry 304 may display the fingerprint at a predetermined location on screen 500. For example, control circuitry 304 may display fingerprint 540 in an upper or lower corner of the screen. In some implementations, the location of the screen may be dynamically adjusted to avoid obstructing display of media content 510 for the user. For example, when an important event is occurring in media content 510 in a lower portion of screen 500, control circuitry 304 may display fingerprint 540 in an upper portion of the screen.

In some embodiments, control circuitry 304 may display fingerprint 540 for a predetermined time period and at predetermined intervals while media content 510 is being displayed. For example, control circuitry 304 may display fingerprint 540 for a period of 30 seconds after which control circuitry 304 may remove fingerprint 540 from the display. Control circuitry 304 may subsequently re-display fingerprint 540 at the same or a different location every 15 minutes for the same or a different period.

In some embodiments, control circuitry 304 may display fingerprint 540 in response to receiving a communication from a service provider operator device. For example, an operator of the service provider may visit a location where the user equipment device is being used to display media content 510 (e.g., a tavern or other public place). At some point in time unknown to the user of the user equipment device, the operator of the service provider may use a device to transmit a communication to the user equipment device which is displaying media content 510. The communication may instruct the user equipment device to display fingerprint 540 (e.g., at a predetermined location, for a predetermined time interval, and/or repeat the display and removal of fingerprint 540 for a predetermined cycle of time). Control circuitry 304 of the user equipment device may receive the communication and retrieve the fingerprint stored in storage 308 for display. The operator device may receive as input the displayed fingerprint 540 and cross-reference the fingerprint with a list of stored fingerprints to identify user account information associated with the fingerprint. The operator device may use the user account information to detect improper use of the user equipment device which displayed the fingerprint. The functionality and operation of the service provider operator device is discussed in more detail in connection with FIGS. 6-8.

In some embodiments, control circuitry 304 may transmit the fingerprint to an operator device in addition to (or instead of displaying the fingerprint) in response to receiving a communication from a service provider operator device. For example, at some point in time unknown to the user of the user equipment device, the operator of the service provider may use the operator device to transmit a communication to the user equipment device which is displaying media content 510. The communication may instruct the user equipment device to transmit and/or display the fingerprint. Control circuitry 304 of the user equipment device may receive the communication and retrieve the fingerprint stored in storage 308 for transmission. The operator device may receive as input the transmitted fingerprint and cross-reference the fingerprint with a list of stored fingerprints to identify user account information associated with the fingerprint. The operator device may use the user account information to detect improper use of the user equipment device which transmitted the fingerprint.

In some embodiments, control circuitry 304 may play back an audible tone associated with the fingerprint which can only be heard by an operator device in addition to (or instead of displaying the fingerprint) in response to receiving a communication from a service provider operator device. For example, at some point in time unknown to the user of the user equipment device, the operator of the service provider may use the operator device to transmit a communication to the user equipment device which is displaying media content 510. The communication may instruct the user equipment device to play back the unique audible tone or tones associated with the fingerprint. Control circuitry 304 of the user equipment device may receive the communication and retrieve the audible tone or tones associated with fingerprint stored in storage 308 for playback. The operator device may pick up as input the played back tone or tones associated with the fingerprint and cross-reference the audible tones with a list of tones associated with stored fingerprints to identify user account information associated with the fingerprint. The operator device may use the user account information to detect improper use of the user equipment device which played back the audible tone or tones associated with the fingerprint. The functionality and operation of the service provider operator device is discussed in more detail in connection with FIGS. 6-8.

Figure 6:
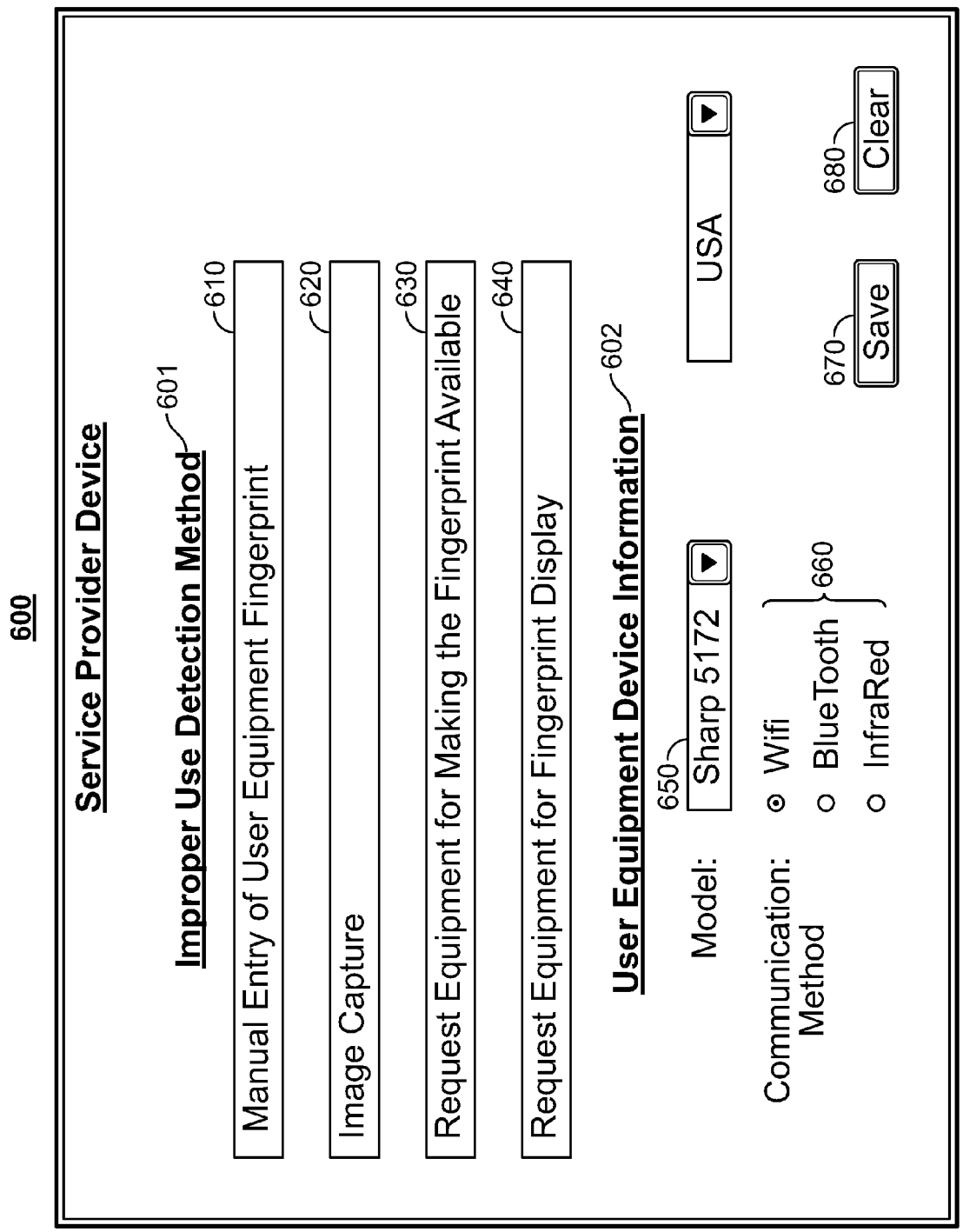
FIG. 6 shows an illustrative display screen of a main menu for detecting unauthorized use of a user equipment device with a service provider device in accordance with another embodiment of the invention.

FIG. 6 shows an illustrative display screen 600 of a main menu for detecting unauthorized use of a user equipment device with a service provider device in accordance with another embodiment of the invention. Screen 600 may include an improper use detection method region 601 and a user equipment device information region 602. Screen 600 may be generated for display on a service provider device. The service provider device may be wireless user communications device 406, user computer equipment 404 or a mobile device such as an iPad, cellular telephone, mobile computing device or any combination of the same. The service provider operator device may generate screen 600 by executing a specific misuse detection application provided by the service provider or by accessing a website over the Internet associated with the service provider. When screen 600 is generated by a website, an operator login may be required in order for screen 600 to be displayed.

User equipment device information region 602 may be used by the operator to identify and select a particular user equipment device which is being tested for misuse. For example, the operator of the service provider device may find a given user equipment device at a particular location (e.g., a tavern) and physically inspect the target device to identify attributes that correspond to the user equipment device. User equipment device information region 602 may provide operator device with enough information to be able to communicate with the user equipment device to receive the fingerprint made available by the user equipment device. User equipment device information region 602 may include make and model information menu 650 and a communication method selection region 660. After inspecting the user equipment device which the operator would like to test for misuse, the operator may input the model and make of the inspected device using drop down menu 650. Depending on the means available for communicating (e.g., WiFi, BlueTooth, InfraRed, etc.) with the user equipment device, the operator may select how the operator device is to communicate with the user equipment device by selecting one or more of radio options 660. After the information identifying the target user equipment device to the operator device, the operator may select a save option 670 to store the information identifying the target user equipment device. Alternatively, the operator may select clear option 680 to input different information that identifies another or the same target user equipment device.

In some embodiments, the operator of service provider device may input into region 602 a specific code associated with a target user equipment device. The code may be inscribed on the user equipment device and read off of the front panel. The service provider device may determine, identify and store the make and model of the target user equipment device using the code that is input into region 602.

Improper use detection method region 601 may allow the operator of service provider device to select how the operator would like to detect misuse. Region 601 may include a manual entry option 610, an automated detection option 620, a request for equipment fingerprint transmission option 630 and a request for fingerprint display option 640. In response to receiving an operator selection of option 610, control circuitry 304 of the operator device may navigate the operator to screen 700 (FIG. 7) which allows the operator to manually input a fingerprint observed by the operator for detecting misuse. In response to receiving an operator selection of option 620, control circuitry 304 of the operator device may navigate the operator to screen 800 (FIG. 8) which automatically uses the operator device to receive a fingerprint from the user equipment device for detecting misuse.

Control circuitry 304 of service provider device may receive an operator selection of option 630. In response, control circuitry 304 of service provider device may transmit a communication to the user equipment device identified in region 602 requesting that the user equipment device make available the fingerprint associated with the user equipment device. For example, control circuitry 304 of service provider device may transmit a communication that includes a data structure with commands that cause the user equipment device to call an API function that retrieves and makes available a fingerprint associated with the user equipment device.

In some embodiments, the communication transmitted by the operator device to the user equipment device may include parameters indicating how the user equipment device is to make the fingerprint available. For example, the communication may specify whether the user equipment device is to display the fingerprint. Alternatively or in addition, the communication may specify whether the user equipment device is to play back a tone associated with the fingerprint. Alternatively or in addition, the communication may specify whether the user equipment device is to transmit a communication back to the operator device with the fingerprint. In some implementations, the communication may specify a time interval during which the user equipment device makes the fingerprint available (e.g., how long the fingerprint should be displayed for, where on the screen the fingerprint should be displayed and how often, such as the repeat cycle).

Control circuitry 304 of service provider device may receive an operator selection of option 640. In response, control circuitry 304 of service provider device may transmit a communication or signal to the user equipment device identified in region 602 requesting that the user equipment device display the fingerprint associated with the user equipment device.

The operator of the service provider may visit a location of a user (e.g., at a public tavern or private residence) to detect misuse of user equipment. The location may or may not be the location which the service provider has listed as being associated with the given user. In particular, the operator may visit any random public place or private residence to detect potential misuse of a user equipment device by cross-referencing a fingerprint being made available with a list of potential user accounts. If a user account matches a given fingerprint at the random location, then the operator may determine that a user equipment is being used that is associated with the service provider. Accordingly, the operator may analyze whether the user equipment is accessing content which the user equipment is authorized to access based on the user account information that matches the fingerprint that is made available. In some embodiments, the operator may manually input a fingerprint being displayed at the location of a user equipment device. In particular, control circuitry 304 of service provider device may receive an operator selection of option 610 and in response may navigate the operator to screen 700 (FIG. 7).

Figure 7:
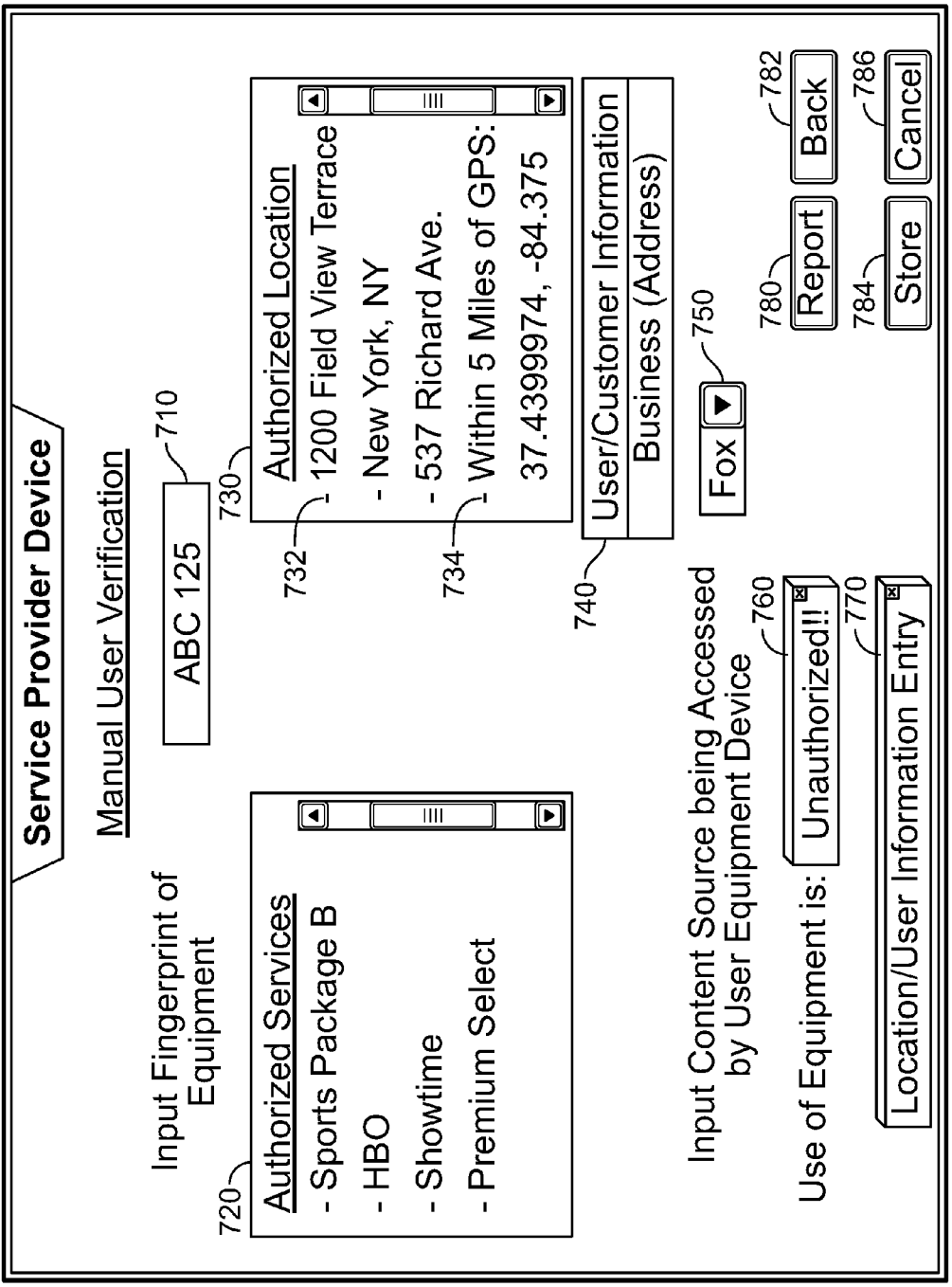
FIGS. 7 and 8 show illustrative display screens of menus for detecting unauthorized use of a user equipment device with a service provider device in accordance with another embodiment of the invention.

FIG. 7 shows illustrative display screen 700 of menus for detecting unauthorized use of a user equipment device with a service provider device in accordance with another embodiment of the invention. Screen 700 may include a fingerprint input region 710, an authorized services region 720 and an authorized location region 730. The operator may use screen 700 to detect misuse of a target user equipment device.

In some embodiments, the operator may monitor a display receiving content from a user equipment device. The operator may wait for the display to make available (e.g., display) the fingerprint associated with the user equipment device. Upon the fingerprint being displayed, the operator may input the displayed fingerprint into region 710. The operator may input the displayed fingerprint by manually inputting the displayed alphanumeric characters or other information identifying the fingerprint using a keypad or other user interface device (e.g., touchscreen or voice recognition).

In some implementations, the fingerprint may be split into multiple sequences of objects (e.g., alphanumeric characters) where a second instance of a sequence is displayed after a predetermined period of time which a first instance is displayed. In such circumstances, control circuitry of the operator device may receive an initial one of the fingerprint sequences through region 710 and may subsequently receive further fingerprints in the sequences using the same or a separate region. In some implementations, control circuitry of the operator device may be informed that the fingerprint is split into multiple objects by way of receiving a user selection of an interactive option (not shown).

In some implementations, the fingerprint displayed may be obscured by being covered with different colors that disappear when colored glasses are worn. For example, control circuitry 304 of the user equipment device may generate a visually scrambled fingerprint by mixing one or more colors around and/or within the fingerprint (e.g., fingerprint values may be in a white color and the region or box around and/or within the fingerprint may be a mix of red and green colored objects—dots or rectangles). Accordingly, when the visually scrambled fingerprint is displayed on the screen, the fingerprint is not discernable to the naked eye because of the other colors that make the fingerprint hard to see. However, when suitably colored glasses are worn by an operator (e.g., glasses with red and green lenses), the fingerprint becomes revealed or visually descrambled and easy to see. The operator may subsequently key in or input the fingerprint into region 710.

In some embodiments, region 710 may include a display of images which correspond to different fingerprints. In particular, the fingerprint displayed by the user equipment device may include one or more images and/or alphanumeric characters. In such circumstances, instead of or in addition to receiving a user input through region 710 of alphanumeric characters, control circuitry of the operator device may receive a user selection of one or more images that identify a given fingerprint.

In some embodiments, after control circuitry of the operator device receives the fingerprint through region 710, control circuitry of the operator device may retrieve subscriber or user account information associated with the received fingerprint. For example, control circuitry of the operator device may establish a connection through communications network 414 (FIG. 4) with the service provider. Control circuitry of the operator device may transmit to the service provider the received fingerprint. The service provider may perform a lookup by cross-referencing subscriber information with fingerprints stored in a database. In particular, the service provider may provide to a database the received fingerprint and the database may return the subscriber or user account information that is associated with the fingerprint.

In some implementations, instead of or in addition to the control circuitry of the operator device communicating the fingerprint to the service provider, control circuitry of the operator device may access the database of user account information directly. For example, the database may be stored locally on the operator device and accordingly, the control circuitry of the operator device may look up the user account information locally using the received fingerprint. Alternatively, control circuitry of the operator device may communicate with the database stored remotely over communications network 414 (FIG. 4) to look up the corresponding user account information using the received fingerprint.

The subscriber information (or user account information) retrieved from the database may include various information that indicates a level of service and/or authorization a given user equipment device is authorized to receive. For example, the subscriber information may include a list of authorized services for the given user equipment device (e.g., packages of programming, specific channels authorized for access, specific content authorized for access, and/or various service authorized such as Internet service, on-demand service, pay-per-view service, etc.). The subscriber information may include a list of authorized locations for the given user equipment device (e.g., GPS coordinates, a range or distance from a certain point or address, one or more addresses, etc.). The subscriber information may include information that identifies a user associated with the user equipment device (e.g., a name of a person or organization or public place), specific model of the user equipment device, account balance and payment information, and/or various activity related information such as media or services that have been accessed within a predetermined period of time (e.g., within the past two weeks).

Control circuitry of the operator device may display all or some of the retrieved user account information in screen 700. For example, control circuitry of the operator device may display the list of authorized services in region 720. Region 720 may be interactive so that the operator may select a given one of the services listed in the region to receive additional information about the service. For example, in response to control circuitry of the operator device receiving a selection of sports package B, control circuitry of the operator device may retrieve and display a list of channels or sources or programming associated or authorized for access with the selected sports package B. This may allow the operator to determine whether the user equipment device is accessing content not included in the authorized content of sports package B and thereby is being misused. In some implementations, in response to control circuitry of the operator device receiving a selection of a service listed in region 720, control circuitry of the operator device may retrieve and display information identifying what is currently being provided by the selected service (e.g., a title of a show and a description of the show being provided on a particular channel that is selected).

In some implementations, control circuitry of the operator device may display the list of authorized locations in region 730. Region 730 may be interactive so that the operator may select a given one of the locations listed in the region to receive additional information about the location. For example, in response to control circuitry of the operator device receiving a selection of a displayed address 732 or GPS coordinate 734, control circuitry of the operator device may retrieve and display a picture of the street or surroundings at address 732 or GPS coordinate 734. In particular, control circuitry of the operator device may search over the Internet for an image or video associated with a given address (e.g., using an online maps service, online (remote) geographic information system, or local geographic information system application) and display the retrieved image or video. This may allow the operator to determine whether the user equipment device is not within some predetermined range (e.g., 1 mile, 2 kilometers or 200 feet) of the selected location and thereby is being misused.

In some implementations, control circuitry of the operator device may display information identifying the user associated with the user account information in user account region 740. For example, control circuitry of the operator device may display the residential or business address stored in the database that is associated with the fingerprint, a customer or user name and contact information, business name, picture of the customer or user, and/or activity performed by the customer or user using the user equipment device associated with the fingerprint (e.g., previous program orders, content sources previously accessed, user profile information).

In some embodiments, the operator using the operator device may detect misuse by visually comparing the content being accessed using the user equipment device and comparing the content being accessed with information listed in regions 720, 730 and/or 740. In particular, the operator may visually determine what content is being accessed by seeing the logo or content source identifier displayed on the screen or by monitoring what program or show is being displayed. The operator may compare what is being displayed with what is listed in the authorized services region 720. If what is being displayed is not listed among the authorized services in region 720, the operator may determine that the user equipment device is being misused. Similarly, the operator may determine the location of the user equipment device outputting to the display by checking an address of the location of the operator or GPS coordinates at the location of the user equipment device. The operator may compare the physical location of the user equipment device with the authorized locations listed in region 730. If that physical location is not listed among the authorized locations in region 730, the operator may determine that the user equipment device is being misused.

In some embodiments, the operator using the operator device may detect misuse by inputting criteria which enables the operator device to automatically detect misuse. In particular, the operator may input criteria using menu 750 which identifies what content is being accessed (e.g., a name of a show or content source such as a television channel). The operator device may compare the input criteria with the authorization information retrieved from the database based on the fingerprint and/or listed in the authorized services region 720. If the input criterion does not match the authorized services retrieved from the database and/or displayed in region 720, the operator device may automatically determine that the user equipment device is being misused and generate an alert 760 informing the operator of the misuse. The alert may be a sound, a video, a message, a prompt, and/or any combination of the same that informs the operator of the misuse. As used above and below, the word "automatically" means without receiving further user input. If the input criterion matches the authorized services retrieved from the database and/or displayed in region 720, the operator device may automatically determine that the user equipment device is not being misused and generate an alert 760 informing the operator that use of the user equipment device is authorized. The alert may be a sound, a video, a message, a prompt, and/or any combination of the same that informs the operator of the user equipment device not being misused and/or being authorized.

In some implementations, the operator may input the location of the user equipment device outputting to the display using menu 750. In particular, the operator may input an address of the physical location of the operator or GPS coordinates at the location of the user equipment device using input region 770. Alternatively, the operator may select an option to have the operator device automatically input the location into region 770 by automatically retrieving a GPS coordinate from GPS circuitry or determining a range of the location of the operator device using any other method (e.g., triangulation). The operator device may automatically compare the physical location of the user equipment device in region 770 with the authorized locations retrieved from the database and/or listed in region 730. If the physical location does not match the authorized locations retrieved from the database and/or displayed in region 730, the operator device may automatically determine that the user equipment device is being misused and generate an alert 760 informing the operator of the misuse. The alert may be a sound, a video, a message, a prompt, and/or any combination of the same that informs the operator of the misuse. If the physical location matches the authorized locations retrieved from the database and/or displayed in region 730, the operator device may automatically determine that the user equipment device is not being misused and generate an alert 760 informing the operator that use of the user equipment device is authorized. The alert may be a sound, a video, a message, a prompt, and/or any combination of the same that informs the operator of the user equipment device not being misused and/or being authorized.

In some embodiments, control circuitry of the operator device may receive a selection of report option 780. In response to receiving the selection of report option 780, control circuitry of the operator device may transmit a communication to the service provider indicating that the user equipment device associated with the user account information is being misused. The service provider may terminate service to the user equipment device and/or send a letter or notification (electronic or otherwise) to the user or user equipment device which is being misused. The letter or notification may alert the user or customer about the misuse and inform the user or client about consequences of continued misuse. An entry may be stored in the database for the fingerprint associated with the user account information indicating a number of times that the user equipment device has been misused. Alternatively or in addition, in response to receiving the selection of report option 780, control circuitry of the operator device may transmit a communication to the user equipment device associated with the user account information. The communication may instruct the user equipment device to self-terminate service. In particular, control circuitry 304 of the user equipment device may prevent further access to content user the user equipment device in response to receiving the communication from the operator device to self-terminate service. For example, further use of the user equipment device may cause a message to be displayed for the user indicating that service has been terminated due to misuse of the user equipment device.

In some embodiments, control circuitry of the operator device may receive a selection of back option 782. In response to receiving the selection of back option 782, control circuitry of the operator device may navigate the operator back to the previous screen or back to screen 600. Control circuitry of the operator device may receive a selection of store option 784. In response to receiving the selection of store option 784, control circuitry of the operator device may store any of the information displayed in screen 700 for the user account information or user equipment device being tested for misuse. Control circuitry of the operator device may receive a selection of cancel option 786. In response to receiving the selection of store cancel 786, control circuitry of the operator device may clear all the fields and information displayed in screen 700 to allow the same or different user equipment device to be tested for misuse.

Referring back to FIG. 6, control circuitry of the operator device may receive a selection of image capture option 620. In response to receiving the selection of option 620, control circuitry of the operator device may navigate the operator to screen 800 (FIG. 8).

Figure 8:
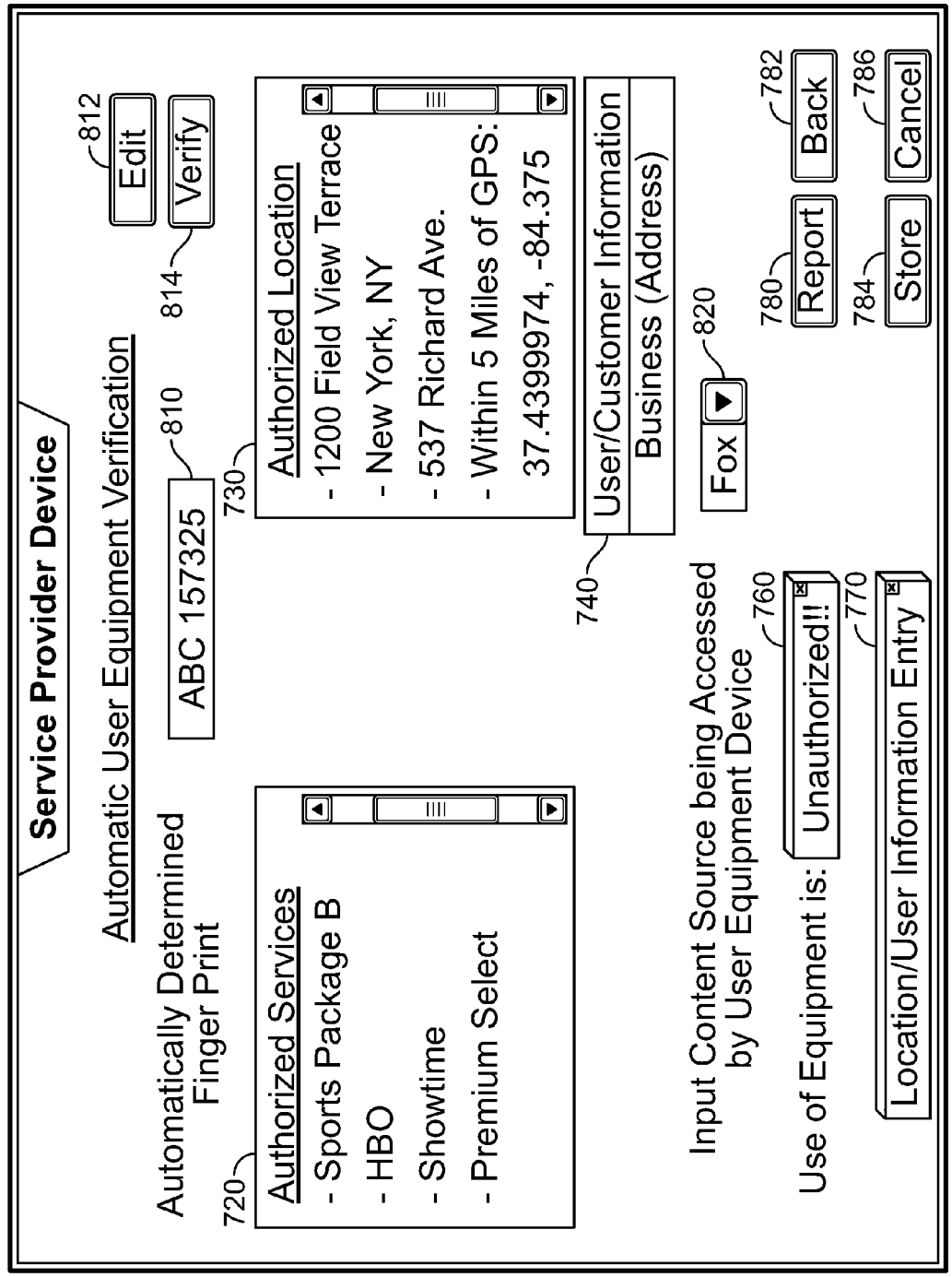

FIG. 8 shows an illustrative display screen 800 of menus for automatically detecting unauthorized use of a user equipment device with a service provider device in accordance with another embodiment of the invention. Screen 800 includes an automatically detected fingerprint region 810, content source being accessed menu 820, edit option 812, verify option 814 and various components and regions previously shown and described in connection with screen 700 (FIG. 7). Those components and regions in screen 800 which are similar to those of screen 700 (FIG. 7) are labeled the same as they are in screen 700. It should be understood that these components and regions that are similarly labeled provide the same or similar functionality and, accordingly, a description of these components and regions is being omitted for the sake of brevity.

In some embodiments, the operator device may determine the fingerprint of the user equipment device automatically. For example, the operator device may use user input interface 310 (e.g., camera equipment including a still image or video camera) to capture an image of a display screen. In particular, the operator device may determine when a fingerprint is being displayed on the screen and in response the operator device may capture an image of the display screen. The operator device may process the image to extract the fingerprint that is displayed. In some implementations, the operator of the operator device may press a button (e.g., capture option (not shown)) in screen 800 and, in response, the operator device may transmit a communication to the user equipment device. The communication may instruct the user equipment device to display the fingerprint at a given time and location on the screen. For example, the user equipment device may be instructed to instantly display the fingerprint. At that moment when the user equipment device displays the fingerprint, the operator device may automatically capture an image of the screen using user input interface 310 (e.g., camera equipment). The operator device may process the image to extract the fingerprint information.

In some implementations, the automatically extracted fingerprint information may be displayed in region 810. The operator may determine based on the information displayed in region 810 whether the fingerprint was properly processed and extracted. In some implementations, the operator may compare the fingerprint information displayed in region 810 with the fingerprint that was displayed in the screen of the user equipment device. When the fingerprint information in region 810 matches that which was displayed on the screen, the operator device may receive an operator selection of verify option 814. In response to receiving the selection of verify option 814, the operator device may continue to detect misuse based on the extracted fingerprint. For example, the operator device may automatically compare the information in region 720, 730 and/or 740 (determined based on the automatically extracted fingerprint) with the location of the user equipment device, content source being accessed and/or content displayed to detect misuse. The process of detecting misuse based on the information in region 720, 730 and/or 740 may be performed manually or automatically as discussed above in connection with FIG. 7.

In some implementations, the fingerprint displayed in region 810 may be different than that which was displayed in the screen associated with the user equipment device. In such circumstances, the operator device may receive a selection of edit option 812. In response, the operator device may allow the operator to correct the fingerprint displayed in region 810. In particular, if one number in the fingerprint displayed in region 810 is wrong, the operator may input the correct number to make the fingerprint accurately reflect the fingerprint that was displayed on the screen associated with the user equipment device.

In some embodiments, the operator device may determine the fingerprint of the user equipment device automatically based on a signal received from the user equipment device. For example, instead of or in addition to displaying the fingerprint on the screen associated with the user equipment device, control circuitry 304 of the user equipment device may transmit a communication that includes the fingerprint of the user equipment device. The operator device may process the communication received and extract the fingerprint of the user equipment device. In some implementations, the operator device may display the received fingerprint in region 810.

In some embodiments, the operator device may determine the fingerprint of the user equipment device automatically based on an audible tone or tones received from the user equipment device. In some implementations, the audible tone or tones may only be heard by a microphone of the operator device. For example, the tone or tones may be modulated at a frequency that is outside of the range of the human ear (e.g., lower than 20 Hz or higher than 20 kHz). For example, instead of or in addition to displaying the fingerprint on the screen associated with the user equipment device, control circuitry 304 of the user equipment device may module an audible tone or tones that represent the fingerprint of the user equipment device. In some implementations, the tone or tones may be unique to the user equipment device. In particular, the audible tone or tones may be of a certain frequency that is only associated with one user equipment device. Alternatively or in addition, the noise pattern or the pulse or number of tones may be unique to the user equipment device. Alternatively or in addition, the tone or tones may include a combination of frequencies or noise patterns that are unique to the user equipment device. The operator device may process the received tone or tones using a microphone and cross-reference the audio pattern or tone or tones with tone or tones stored in a database to determine the user account information associated with the given audio pattern.

In some implementations, the operator device may automatically detect misuse based on the fingerprint made available (e.g., by being displayed and captured with an image or electronically received through a communication). In particular, the operator device may cross-reference the received fingerprint with the user account information stored in a database (as discussed above in connection with FIG. 7) to populate the information displayed in regions 720, 730 and/or 740. The operator device may automatically determine a location of the user equipment device by extracting information from a GPS device of the operator device. The operator device may compare the GPS information with information displayed or associated with region 730 to detect misuse. When the operator device detects misuse, an alert may be displayed in prompt 760.

The operator device may determine the content source being accessed by the user equipment device and/or the content being displayed based on a communication the operator device receives from control circuitry 304 of the user equipment device. The content source being accessed by the user equipment device and/or the content being displayed by the user equipment device may be displayed in menu 820. The operator may determine whether the information displayed in menu 820 accurately reflects what is actually shown and/or accessed by the user equipment device. When there is an error, the operator may change the value shown in menu 820. The operator device may compare automatically determined content source being accessed and/or content being displayed with information displayed or associated with region 720 to detect misuse. When the operator device detects misuse, an alert may be displayed in prompt 760.

Figure 9A:
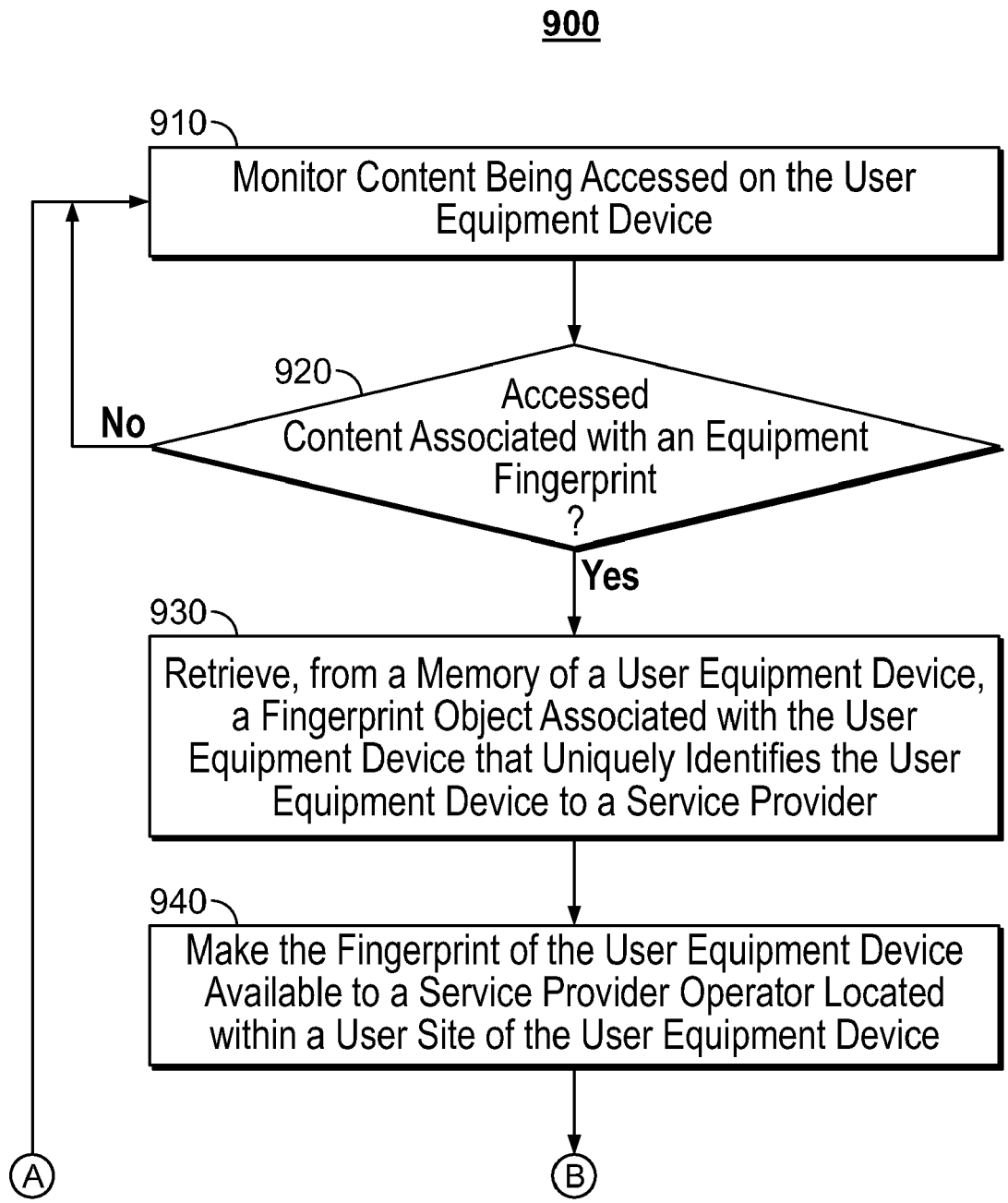
FIGS. 9A-B, 10A-B and 11 illustrate flow diagrams for detecting unauthorized use of a user equipment device in accordance with an embodiment of the invention.
Figure 9B:
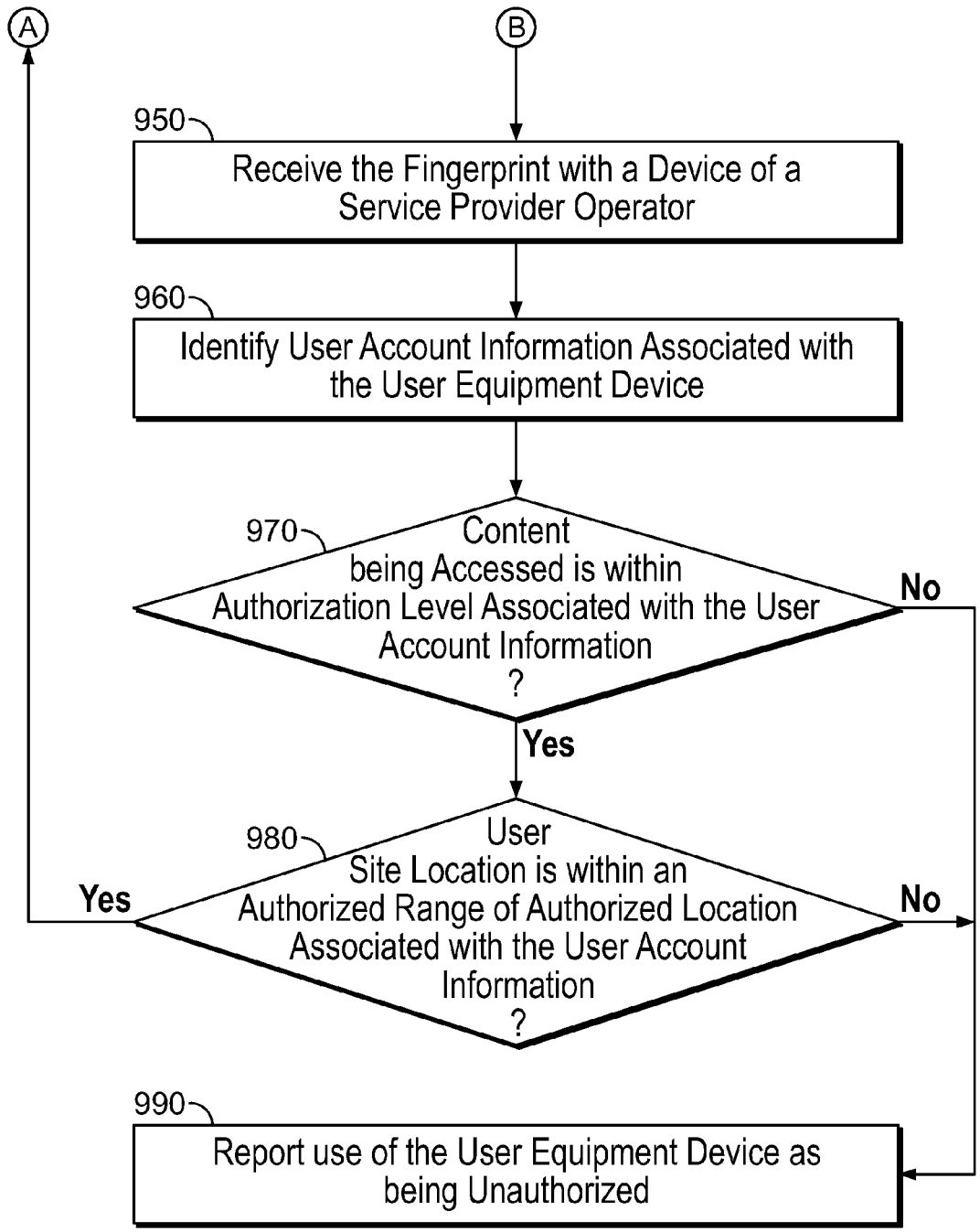

FIGS. 9A and 9B illustrate a flow diagram 900 for detecting unauthorized use of a user equipment device in accordance with an embodiment of the invention. At step 910, content being accessed on a user equipment device is monitored. For example, control circuitry 304 may determine what media is being accessed at the user equipment device by extracting a title of the media or analyzing the content source of the media.

At step 920, a determination is made as to whether the content being accessed is associated with an equipment fingerprint. When the content being accessed is associated with a fingerprint, the process proceeds to step 930, otherwise the process returns to step 910. For example, control circuitry 304 may cross-reference the media or media source being accessed with a list of media or sources that are associated with a fingerprint.

At step 930, a fingerprint object is retrieved from a memory of the user equipment device, where the fingerprint object uniquely identifies the user equipment device to a service provider. For example, control circuitry 304 may retrieve the fingerprint stored in dedicated storage 308 of the user equipment device (FIG. 3).

At step 940, the fingerprint of the user equipment device is made available to a service provider operator located within (or at) a user site of the user equipment device. For example, control circuitry 304 may display fingerprint 540 at a predetermined time and/or location on screen 500 associated with the user equipment device (FIG. 5). Alternatively or in addition, control circuitry 304 may transmit a communication or generate an audio signal or tone that represents the fingerprint to an operator device.

At step 950, the fingerprint is received with a device of a service provider operator. For example, the fingerprint may be manually input by an operator of the operator device using input region 710 (FIG. 7). Alternatively, the fingerprint may be automatically determined based on information received by the operator device and displayed in region 810 (FIG. 8). For example, the operator device may listen to an audible tone or audio signal that represents the fingerprint, capture and process an image that includes the fingerprint and/or receive an electronic communication that includes the fingerprint from the user equipment device.

At step 960, user account information associated with the user equipment device is identified using the fingerprint. For example, the operator device may cross-reference the automatically or manually input fingerprint with user account information stored in a database. The database may be locally stored or remotely stored (e.g., at a server of the service provider) and accessed by the operator device. In particular, the operator device may provide as input to the database the fingerprint and the database may return to the operator device user account information associated with the fingerprint.

At step 970, a determination is made as to whether the content being accessed is within an authorization level associated with the user account information. When the content being accessed is within the authorization level, the process proceeds to step 980, otherwise the process proceeds to step 990. For example, the operator device may determine what content is being displayed or what content source is being accessed either manually by the user inputting the information into menu 750 (FIG. 7) or automatically by receiving a communication identifying the monitored content from the user equipment device and displaying that information in menu 820 (FIG. 8). The operator device may compare the content being displayed and/or the content source being accessed with the authorized content associated with the user account information (e.g., the authorized content displayed in region 720). In some implementations, the comparison may be manually performed by the operator of the operator device by visually comparing the content being accessed with the information displayed in region 720 (FIG. 7).

At step 980, a determination is made as to whether the user site location is within an authorized range of authorized locations associated with the user account information. When the user site is within an authorized range of the authorized locations, the process returns to step 910, otherwise the process proceeds to step 990. For example, the operator device may determine a location of the user equipment device either manually by the user inputting the information into region 740 (FIG. 7), automatically by retrieving GPS coordinates from GPS circuitry or automatically by cross-referencing GPS coordinates from GPS circuitry with an address associated with those GPS coordinates. The operator device may compare the location of the user equipment device with the authorized location(s) associated with the user account information (e.g., the authorized location(s) displayed in region 730). In some implementations, the comparison may be manually performed by the operator of the operator device by visually comparing the location of the user equipment device (e.g., the location of the operator at the user site) with the information displayed in region 730 (FIG. 7).

At step 990, use of the user equipment device is reported as being unauthorized (e.g., misuse of the user equipment device is reported). For example, the operator device may transmit a communication to the service provider indicating that the user equipment device associated with the user account information is being misused. Alternatively or in addition, the operator device may transmit a communication to the user equipment device associated with the user account information instructing the user equipment device to self-terminate service.

In some embodiments, there may be multiple user equipment devices outputting information or content to multiple displays (e.g., in a tavern). In such circumstances, it may be difficult to determine which user equipment device actually is outputting the information being displayed. More specifically, it may be difficult to determine what user equipment device corresponds to the fingerprint being shown on a given display screen. In some implementations, to ensure the user equipment device that is being tested for misuse is the one outputting the fingerprint being analyzed to the display is to compare what content is actually being shown or what content source is actually being accessed in the display where the fingerprint is shown with the content or content source a given user equipment device is actually accessing or outputting to a display. This process is further explained below in connection with FIG. 10.

Figure 10A:
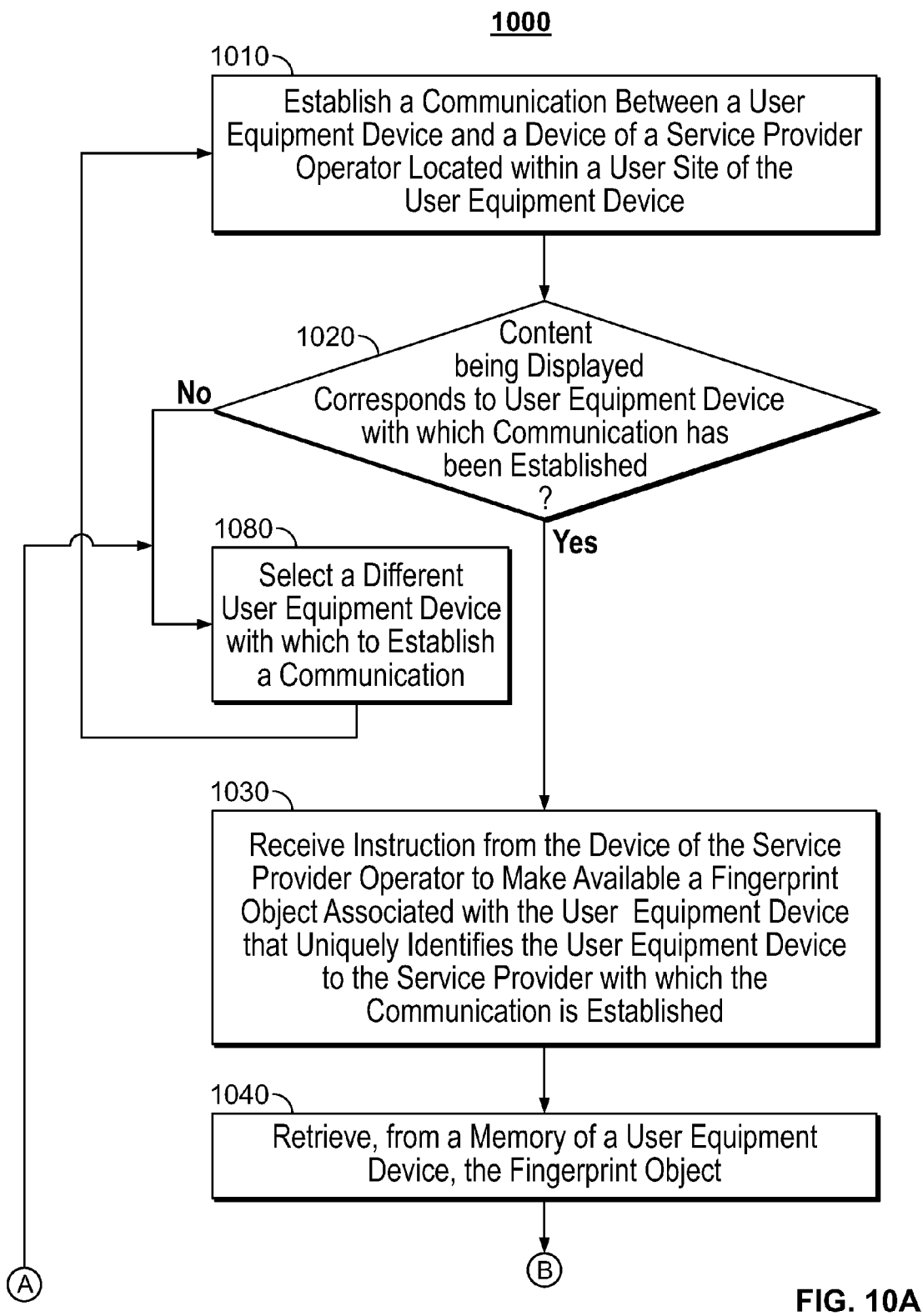
Figure 10B:
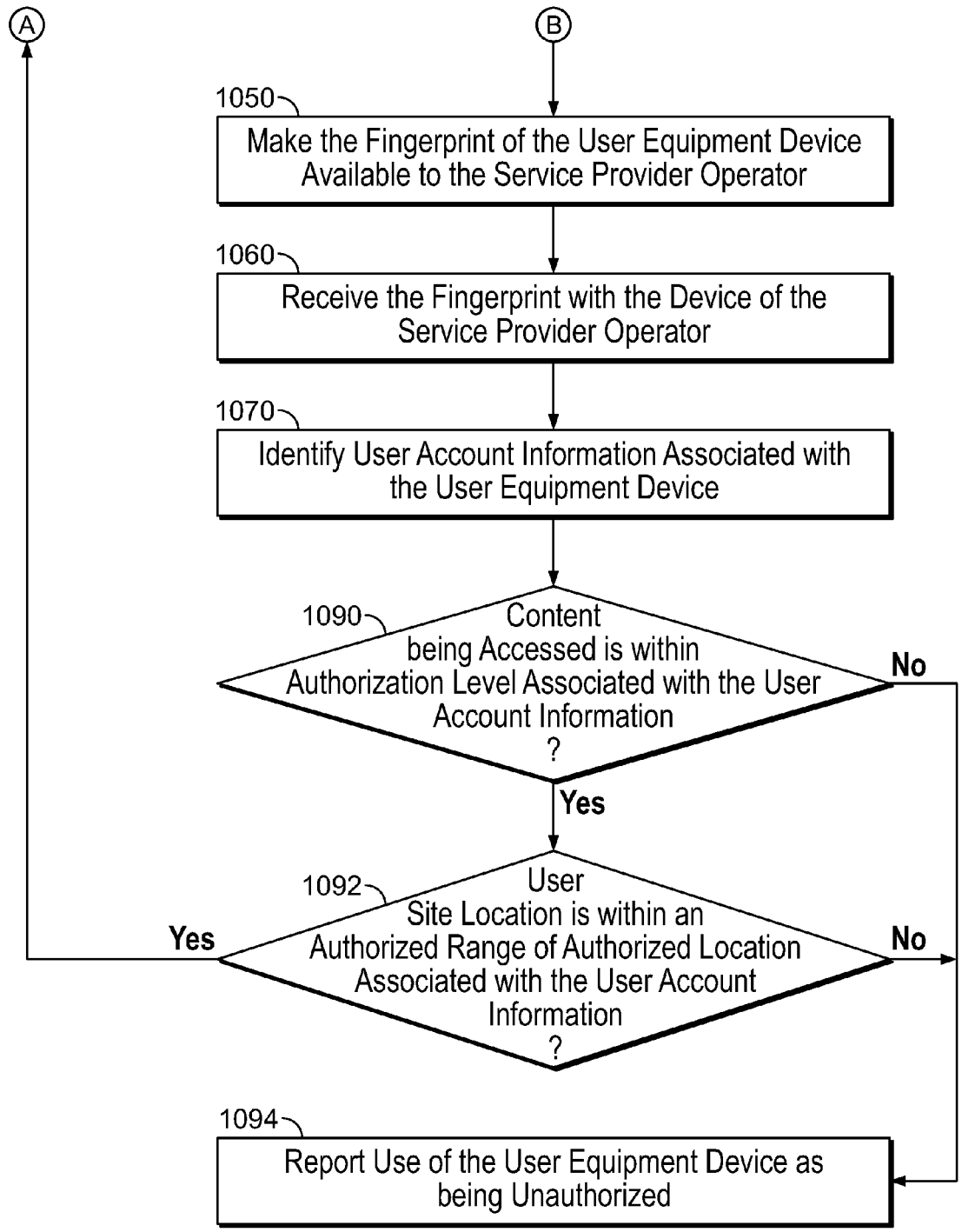

FIGS. 10A and 10B illustrate a flow diagram 1000 for detecting unauthorized use of a user equipment device in accordance with an embodiment of the invention. At step 1010, a communication is established between a user equipment device and a device of a service provider operator located within a user site of the user equipment device. For example, the operator device may establish a line of site communication with the user equipment device (e.g., an infra-red communication).

At step 1020, a determination is made as to whether the content being displayed on a screen corresponds to a user equipment device with which communication has been established. When the content being displayed corresponds to the user equipment device, the process proceeds to step 1030, otherwise the process proceeds to step 1080. For example, the operator device may receive a communication from the user equipment device indicating what content the user equipment device is displaying or what content source the user equipment device is accessing currently. Alternatively or in addition, the user equipment device may also transmit information identifying the GPS coordinates of the user equipment device. In some implementations, the operator device may compare the received information with what is actually being shown on the display screen. In particular, the operator device may receive manual input from the user (e.g., using menu 820 (FIG. 8)) indicating what content is being displayed or what content source is being accessed on a given display screen.

In some implementations, the operator device may compare what is being shown on a display screen with what a given user equipment device transmission indicates the user equipment device is accessing or displaying. Alternatively, the operator device may automatically determine what content is being displayed or what content source is being accessed on a given display screen by capturing an image and analyzing the contents of the image to extract content identifying information and/or content source identifying information. The operator device may compare what is being shown on a display screen with what a given user equipment device transmission indicates the user equipment device is accessing or displaying. Similarly, the operator device may compare a GPS coordinate range of the operator device with what a given user equipment device transmission indicates as the location of the user equipment device.

At step 1080, a different user equipment device is selected with which to establish a communication. For example, the operator device may transmit a discovery communication or message that causes any user equipment device within a predetermined range to transmit an identification message (e.g., an IP address or Bluetooth ID number). The operator device may determine whether any of the identification messages received from nearby user equipment devices corresponds to a user equipment device that has already been tested as being the user equipment device that is outputting to the display with the fingerprint. The operator device may select to communicate with one of the user equipment devices that has not yet been tested as being the user equipment device that is outputting to the display with the fingerprint or the display that is being tested for user equipment device misuse.

At step 1030, an instruction is received from the service provider device to make available a fingerprint object associated with the user equipment device that uniquely identifies the user equipment device to the service provider. For example, the operator device may transmit an instruction to the selected user equipment device requesting that the user equipment device make available the fingerprint.

At step 1040, the fingerprint object is retrieved from a memory of the user equipment device. For example, control circuitry 304 may retrieve the fingerprint stored in dedicated storage 308 of the user equipment device (FIG. 3).

At step 1050, the fingerprint of the user equipment device is made available to the service provider operator. For example, control circuitry 304 may display fingerprint 540 at a predetermined time and/or location on screen 500 associated with the user equipment device (FIG. 5). Alternatively or in addition, control circuitry 304 may transmit a communication or generate an audio signal or tone that represents the fingerprint to an operator device.

At step 1060, the fingerprint is received with the service provider device. For example, the fingerprint may be manually input by an operator of the operator device using input region 710 (FIG. 7). Alternatively, the fingerprint may be automatically determined based on information received by the operator device and displayed in region 810 (FIG. 8). For example, the operator device may listen to an audible tone or audio signal that represents the fingerprint, capture and process an image that includes the fingerprint and/or receive an electronic communication that includes the fingerprint from the user equipment device.

At step 1070, user account information associated with the user equipment device is identified. For example, the operator device may cross-reference the automatically or manually input fingerprint with user account information stored in a database. The database may be locally stored or remotely stored (e.g., at a server of the service provider) and accessed by the operator device. In particular, the operator device may provide as input to the database the fingerprint and the database may return to the operator device user account information associated with the fingerprint.

At step 1090, a determination is made as to whether the content being accessed is within an authorization level associated with the user account information. When the content being accessed is within the authorization level, the process proceeds to step 1092, otherwise the process proceeds to step 1094. For example, the operator device may determine what content is being displayed or what content source is being accessed either manually by the user inputting the information into menu 750 (FIG. 7) or automatically by receiving a communication identifying the monitored content from the user equipment device and displaying that information in menu 820 (FIG. 8). The operator device may compare the content being displayed and/or the content source being accessed with the authorized content associated with the user account information (e.g., the authorized content displayed in region 720). In some implementations, the comparison may be manually performed by the operator of the operator device by visually comparing the content being accessed with the information displayed in region 720 (FIG. 7).

At step 1092, a determination is made as to whether the user site location is within an authorized range of authorized locations associated with the user account information. When the user site is within an authorized range of the authorized locations, the process returns to step 1080, otherwise the process proceeds to step 1094. For example, the operator device may determine a location of the user equipment device either manually by the user inputting the information into region 740 (FIG. 7), automatically by retrieving GPS coordinates from GPS circuitry or automatically by cross-referencing GPS coordinates from GPS circuitry with an address associated with those GPS coordinates. The operator device may compare the location of the user equipment device with the authorized location(s) associated with the user account information (e.g., the authorized location(s) displayed in region 730). In some implementations, the comparison may be manually performed by the operator of the operator device by visually comparing the location of the user equipment device (e.g., the location of the operator at the user site) with the information displayed in region 730 (FIG. 7).

At step 1094, use of the user equipment device is reported as being unauthorized (e.g., misuse of the user equipment device is reported). For example, the operator device may transmit a communication to the service provider indicating that the user equipment device associated with the user account information is being misused. Alternatively or in addition, the operator device may transmit a communication to the user equipment device associated with the user account information instructing the user equipment device to self-terminate service.

Figure 11:
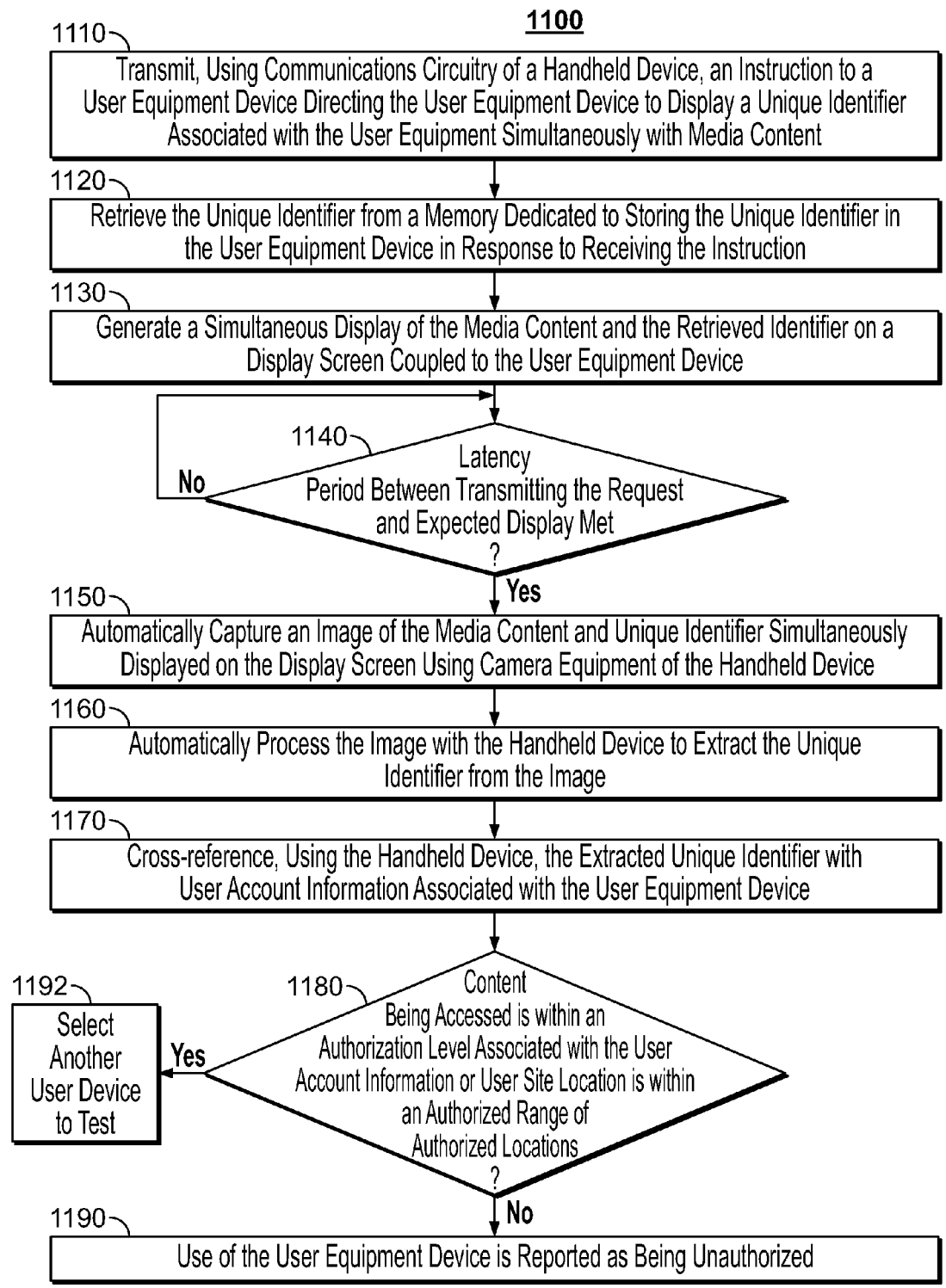

FIG. 11 illustrates a flow diagram 1100 for detecting unauthorized use of a user equipment device in accordance with an embodiment of the invention. At step 1110, an instruction is transmitted using communications circuitry of a handheld device to a user equipment device directing the user equipment device to display a unique identifier associated with the user equipment device simultaneously with media content. For example, the operator device may be a handheld device that transmits an instruction to a user equipment device requesting that the user equipment device display the fingerprint associated with the user equipment device.

At step 1120, the unique identifier is retrieved from a memory dedicated to storing the unique identifier in the user equipment device in response to receiving the instruction. For example, the fingerprint may be stored in a dedicated portion of storage 308 of the user equipment device and control circuitry 304 of the user equipment device may retrieve the unique identifier from storage 308.

At step 1130, a simultaneous display of the media content and the retrieved unique identifier is generated with the user equipment device for display on a display screen coupled to the user equipment device. For example, user equipment device may generate display screen 500 which shows media content 510 simultaneously with fingerprint 540 (FIG. 5).

At step 1140, a determination is made as to whether a latency period between transmission of the request to simultaneously display the unique identifier and media content and the expected display time is met. When the latency period is met, the process proceeds to step 1150, otherwise the process returns to step 1140. For example, processing circuitry of the operator device may be preconfigured with a time period that reflects the amount of time it takes between the time the operator device transmits a request for a fingerprint (e.g., using RF, Bluetooth or WiFi communication scheme) and when that fingerprint actually gets displayed with the user equipment device. The amount of time may also account for the period of time the fingerprint is displayed on the screen (e.g., 3 seconds). The amount of time may differ depending on the type of user equipment device which is being requested to display the fingerprint. For example, newer faster user equipment devices may require a smaller latency period while older slower user equipment devices may require a larger latency period.

At step 1150, an image of the media content and unique identifier simultaneously displayed on the display screen is automatically captured using camera equipment of the handheld device. For example, user input interface 310 of the operator device may include camera equipment and automatically at the right time when the unique identifier is displayed capture an image of display screen 500.

At step 1160, the captured image is automatically processed with the handheld device to extract the unique identifier from the image. For example, control circuitry of the operator device may apply any suitable image processing techniques to identify specific objects in an image. The image processing technique may be executed by the control circuitry of the operator device to identify, extract and/or convert the unique identifier from the captured image (e.g., using character recognition techniques) to alphanumeric characters or other digital representation.

At step 1170, the extracted unique identifier is cross-referenced using the handheld device with database to retrieve user account information associated with the user equipment device. For example, a local or remote database may include a mapping between unique identifiers or fingerprints and user account information. The operator device may query the database using the extracted unique identifier to retrieve the user account information corresponding to the unique identifier.

At step 1180, a determination is made as to whether the content being accessed is within an authorized level associated with the user account information or whether a user site location is within an authorized range of authorized locations associated with the user account information. When the content being accessed is within an authorized level or the user site location is within an authorized range of authorized locations, the process proceeds to step 1192, otherwise the process proceeds to step 1190.

At step 1192, another user equipment device is selected by the handheld device to test for misuse.

At step 1190, use of the user equipment device is reported as being unauthorized (e.g., misuse of the user equipment device is reported) by the handheld device. For example, the operator device may transmit a communication to the service provider indicating that the user equipment device associated with the user account information is being misused. Alternatively or in addition, the operator device may transmit a communication to the user equipment device associated with the user account information instructing the user equipment device to self-terminate service.

It should be understood that the above steps of the flow diagrams of FIGS. 9A-B, 10A-B, and 11 may be executed or performed in any order or sequence not limited to the order and sequence shown and described in the figures. Also, some of the above steps of the flow diagrams of FIGS. 9A-B, 10A-B and 11 may be executed or performed substantially simultaneously where appropriate or in parallel to reduce latency and processing times.

The above-described embodiments of the present disclosure are presented for purposes of illustration and not of limitation, and the present disclosure is limited only by the claims which follow.

What is claimed is:

1. A method for detecting unauthorized use of a user equipment device, the method comprising:
    transmitting, using communications circuitry of a handheld device, an instruction to the user equipment device directing the user equipment device to display a unique identifier associated with the user equipment simultaneously with media content;
    after transmitting the instruction to the user equipment device, automatically capturing an image of the media content and unique identifier simultaneously displayed on a display screen coupled to the user equipment device using camera equipment of the handheld device;
    automatically processing the image with the handheld device to extract the unique identifier from the image; and
    cross-referencing, using the handheld device, the extracted unique identifier with user account information associated with the user equipment device to determine whether use of the user equipment device is unauthorized, wherein cross-referencing comprises:
        utilizing circuitry of the handheld device to identify a geographical location of the user equipment device based on GPS information received by the handheld device or user entered location information;
        identifying an authorized location in which the user equipment device is authorized for use based on the user account information; and
        determining whether the geographical location of the user equipment device is within an authorized range of the authorized location.

2. The method of claim 1, wherein the user equipment device retrieves the unique identifier from a memory dedicated to storing the unique identifier in response to receiving the instruction.

3. The method of claim 1, wherein the user equipment device displays the retrieved unique identifier at a predetermined location on the display screen.

4. The method of claim 1, wherein the unique identifier is displayed at a predetermined time interval unknown to a user of the user equipment device.

5. The method of claim 1, wherein the unique identifier includes at least one of a unique numerical value and an image unique to the user equipment device.

6. The method of claim 1, wherein the cross-referencing comprises:
    identifying a list of services authorized for access on the user equipment device based on the user account information; and
    determining whether content displayed on the user equipment device is included in the list of services.

7. The method of claim 6, wherein the determining comprises:
    automatically processing the image with the handheld device to extract the media content from the image;
    receiving input from an operator of the handheld device identifying the service associated with the media content; and
    comparing the identified service with the services included in the list.

8. The method of claim 6, wherein the list of services includes media content and media content sources.

9. A system for detecting unauthorized use of a user equipment device, the system comprising:
    a handheld device comprising control circuitry, camera equipment and communications circuitry, wherein the control circuitry is configured to:
        transmit, using the communications circuitry, an instruction to the user equipment device directing the user equipment device to display a unique identifier associated with the user equipment simultaneously with media content;
        after transmitting the instruction to the user equipment device, automatically capture an image of the media content and unique identifier simultaneously displayed on a display screen coupled to the user equipment device using the camera equipment;
        automatically process the image to extract the unique identifier from the image; and
        cross-reference the extracted unique identifier with user account information associated with the user equipment device to determine whether use of the user equipment device is unauthorized by:
            utilizing circuitry of the handheld device to identify a geographical location of the user equipment device based on GPS information received by the handheld device or user entered location information; and identifying an authorized location in which the user equipment device is authorized for use based on the user account information; and determining whether the geographical location of the user equipment device is within an authorized range of the authorized location.

10. The system of claim 9, wherein the user equipment device retrieves the unique identifier from a memory dedicated to storing the unique identifier in response to receiving the instruction.

11. The system of claim 9, wherein the user equipment device displays the retrieved unique identifier at a predetermined location on the display screen.

12. The system of claim 9, wherein the unique identifier is displayed at a predetermined time interval unknown to a user of the user equipment device.

13. The system of claim 9, wherein the unique identifier includes at least one of a unique numerical value and an image unique to the user equipment device.

14. The system of claim 9, wherein the control circuitry is further configured to cross-reference by:

identifying a list of services authorized for access on the user equipment device based on the user account information; and determining whether content displayed on the user equipment device is included in the list of services.

15. The system of claim 14, wherein the control circuitry is further configured to:

automatically process the image to extract the media content from the image;

receive input from an operator of the handheld device identifying the service associated with the media content; and compare the identified service with the services included in the list.

16. The system of claim 14, wherein the list of services includes media content and media content sources.

* * * * *